(12) United States Patent
Choi et al.

(10) Patent No.: US 12,431,749 B2
(45) Date of Patent: Sep. 30, 2025

(54) MOTOR

(71) Applicant: LG INNOTEK CO., LTD., Seoul (KR)

(72) Inventors: Dae Ho Choi, Seoul (KR); Sang Jin Kim, Seoul (KR); Gi Chang Moon, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 217 days.

(21) Appl. No.: 18/033,864

(22) PCT Filed: Oct. 28, 2021

(86) PCT No.: PCT/KR2021/015345
§ 371 (c)(1),
(2) Date: Apr. 26, 2023

(87) PCT Pub. No.: WO2022/092870
PCT Pub. Date: May 5, 2022

(65) Prior Publication Data
US 2023/0402887 A1    Dec. 14, 2023

(30) Foreign Application Priority Data

Oct. 28, 2020   (KR) ........................ 10-2020-0141134
Oct. 30, 2020   (KR) ........................ 10-2020-0143159
Nov. 9, 2020    (KR) ........................ 10-2020-0148430

(51) Int. Cl.
*H02K 1/278*     (2022.01)
*H02K 1/28*      (2006.01)
*H02K 16/00*     (2006.01)

(52) U.S. Cl.
CPC ............... *H02K 1/278* (2013.01); *H02K 1/28* (2013.01); *H02K 16/00* (2013.01)

(58) Field of Classification Search
CPC .......... H02K 1/278; H02K 1/28; H02K 16/00; H02K 2201/06; H02K 2213/03
See application file for complete search history.

(56) References Cited

U.S. PATENT DOCUMENTS

| 2013/0057102 A1* | 3/2013 | Yamada ............... H02K 21/044 |
|---|---|---|
|  |  | 310/156.07 |
| 2018/0069443 A1 | 3/2018 | Han et al. |
| 2021/0143712 A1* | 5/2021 | Nagasugi ............... H02K 15/02 |

FOREIGN PATENT DOCUMENTS

| JP | H11-215747 | 8/1999 |
|---|---|---|
| JP | 2012-016236 | 1/2012 |

(Continued)

OTHER PUBLICATIONS

European Search Report dated Sep. 26, 2024 issued in Application No. 21886864.4.

(Continued)

*Primary Examiner* — Thomas Truong
(74) *Attorney, Agent, or Firm* — KED & ASSOCIATES, LLP

(57) ABSTRACT

The present invention can provide a motor including a shaft, a rotor coupled to the shaft, and a stator disposed to correspond to the rotor, wherein the rotor includes a rotor core, a plurality of magnets coupled to the rotor core, and a magnet holder disposed outside the magnets, the rotor core includes protrusions disposed between the adjacent magnets, the magnet holder includes a first part disposed on a side surface of each of the magnets and a second part connected to the first part and disposed on one surface of the magnet, the second part includes holes, and a part of each of the protrusions and a part of the magnet are exposed through one of the holes.

9 Claims, 41 Drawing Sheets

(56) References Cited

FOREIGN PATENT DOCUMENTS

| | | |
|---|---|---|
| JP | 2012-080718 | 4/2012 |
| JP | 2013-258887 | 12/2013 |
| JP | 2019-187167 | 10/2019 |
| JP | 2019187167 A * | 10/2019 |
| KR | 2001-218403 | 8/2001 |
| KR | 20150051566 A * | 5/2015 |
| KR | 10-2019-0129479 | 11/2019 |
| KR | 10-2120314 | 6/2020 |
| WO | WO 2019/073579 | 4/2019 |

OTHER PUBLICATIONS

International Search Report dated Feb. 11, 2022 issued in Application No. PCT/KR2021/015345.
European Search Report dated Jan. 28, 2025 issued in Application No. 21886864.4.
Japanese Office Action dated Jul. 1, 2025, issued in Application No. JP 2023-526384.

* cited by examiner

[FIG. 1]
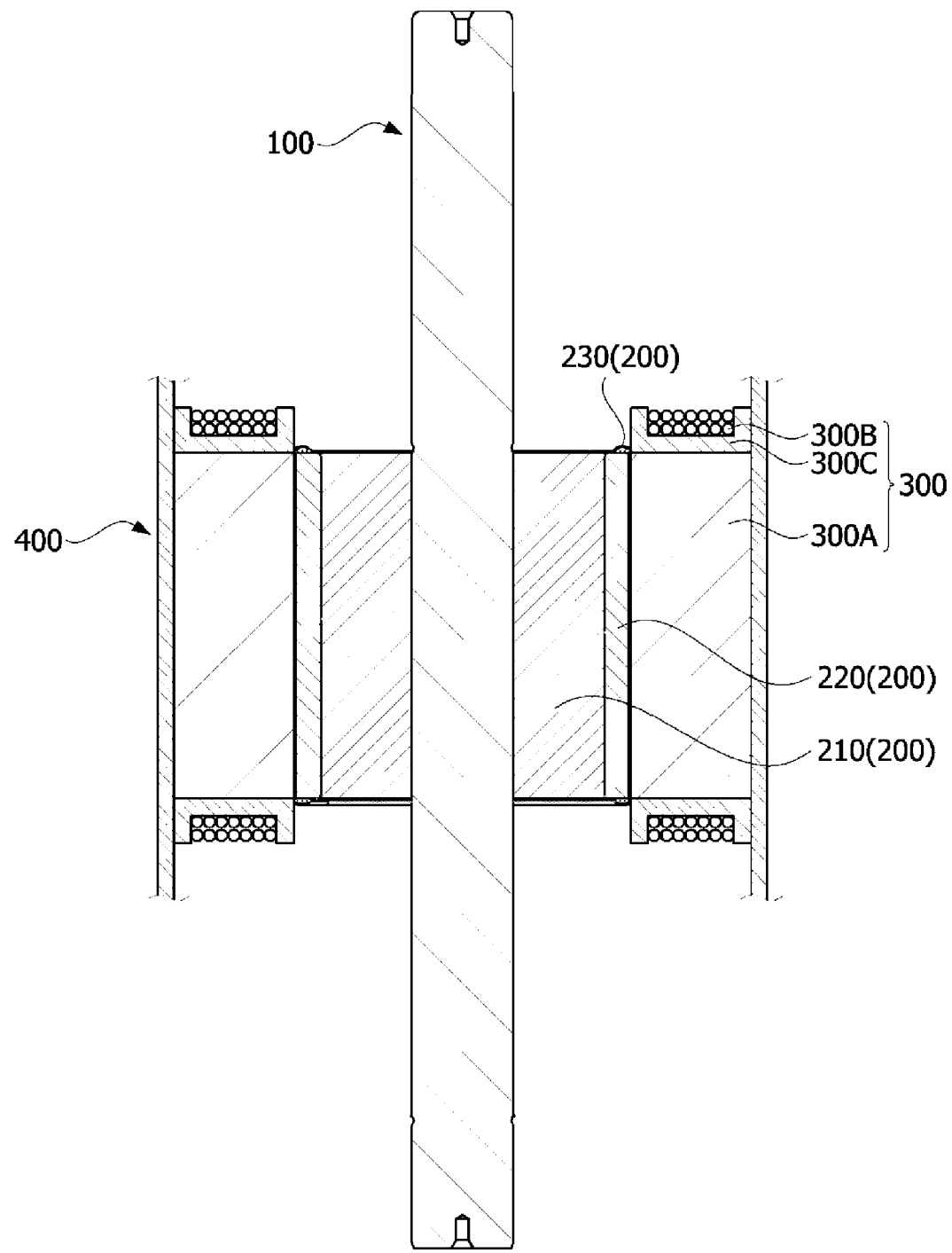

[FIG. 2]
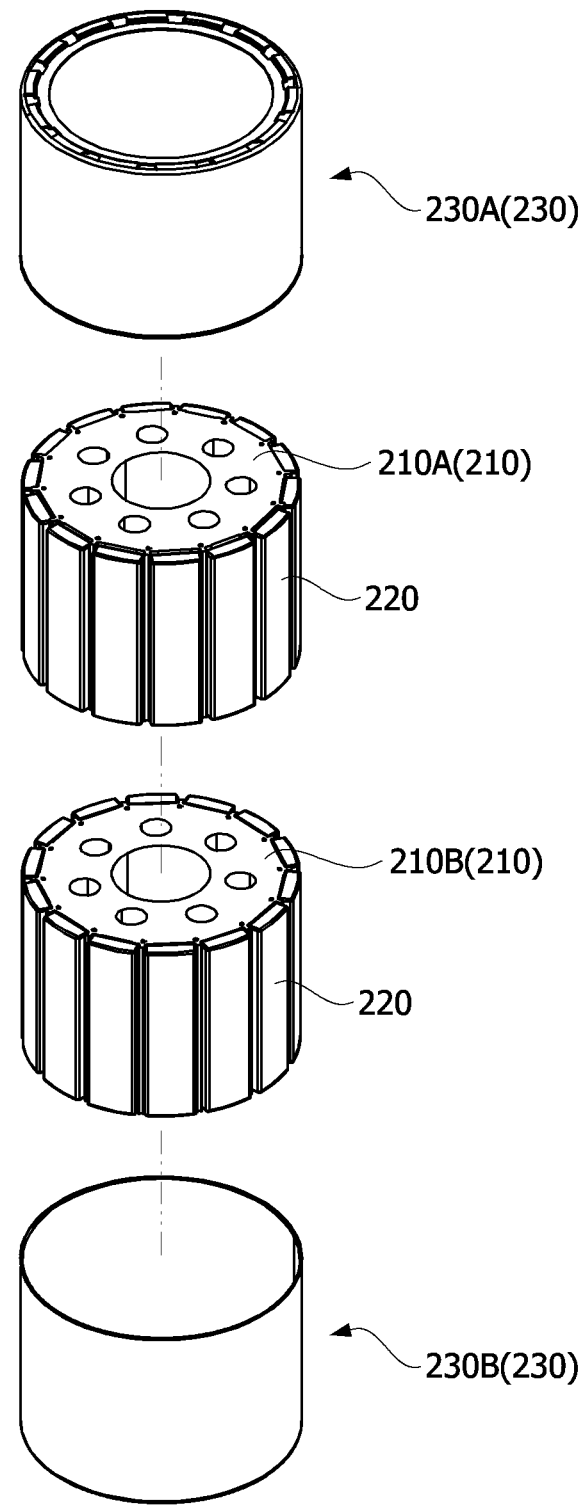

[FIG. 3]
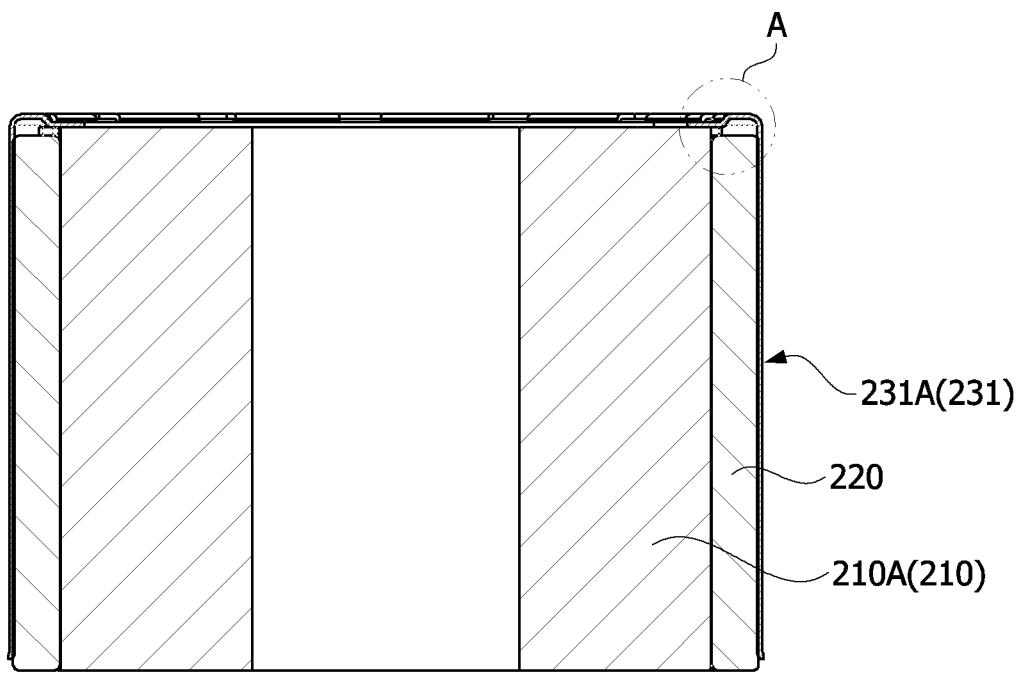

[FIG. 4]
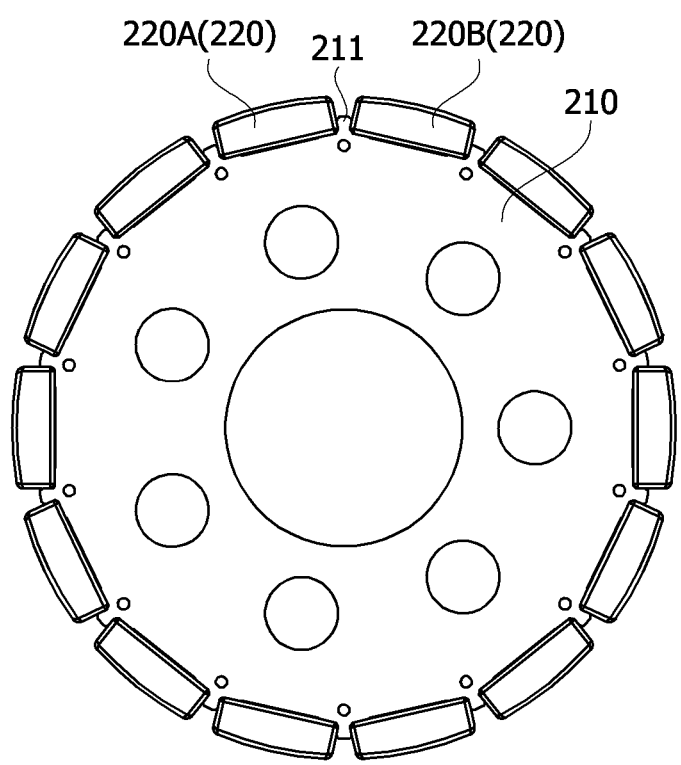

[FIG. 5]
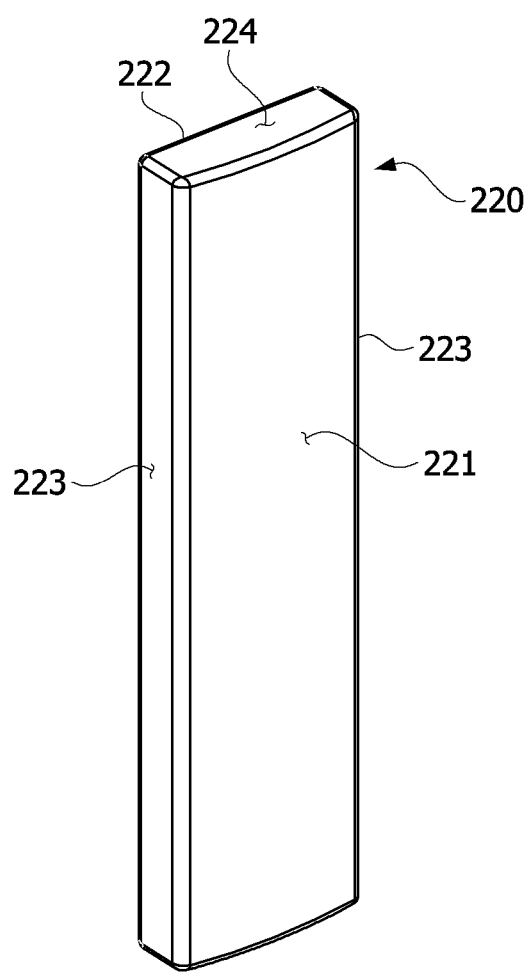

[FIG. 6]
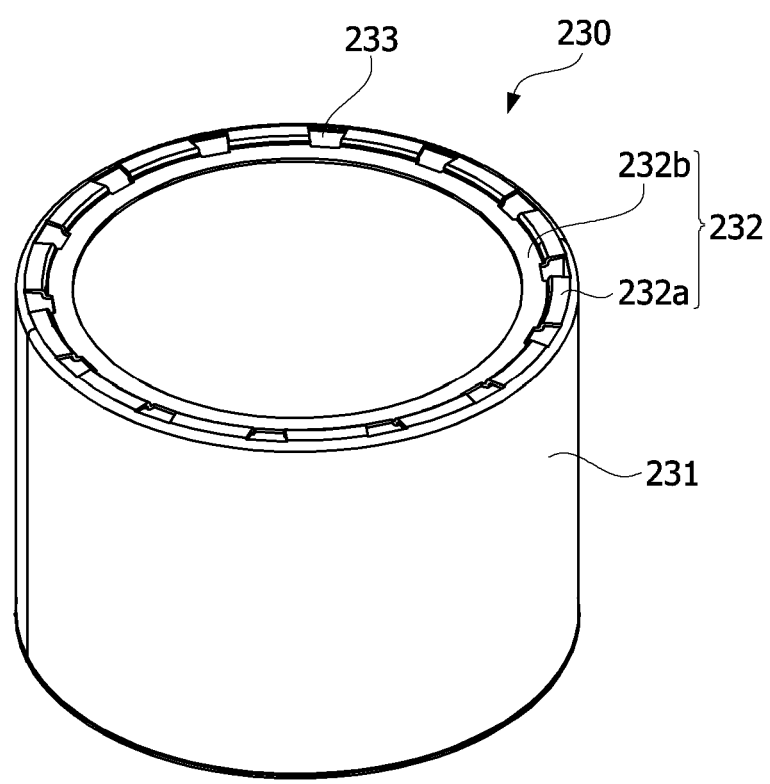

[FIG. 7]
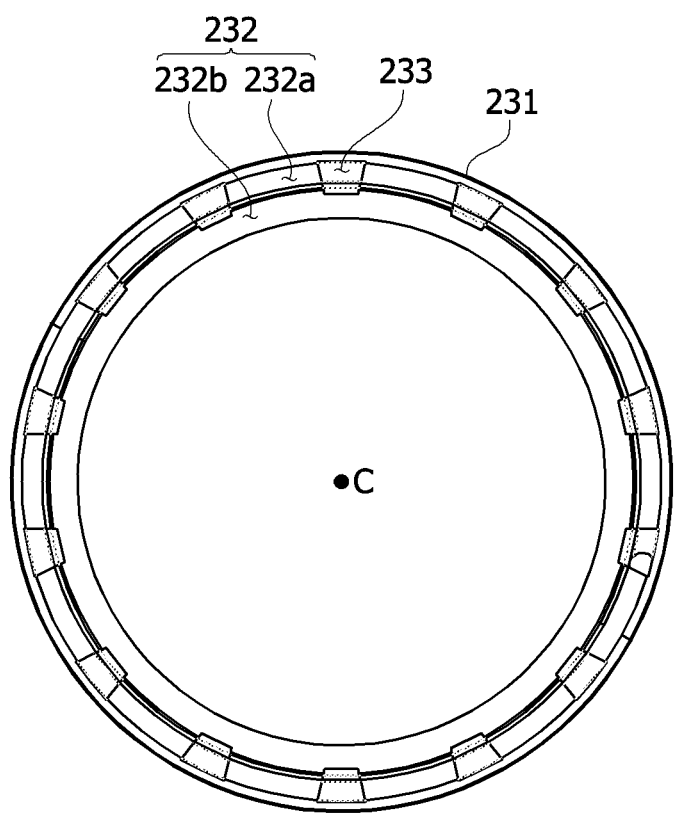

[FIG. 8]
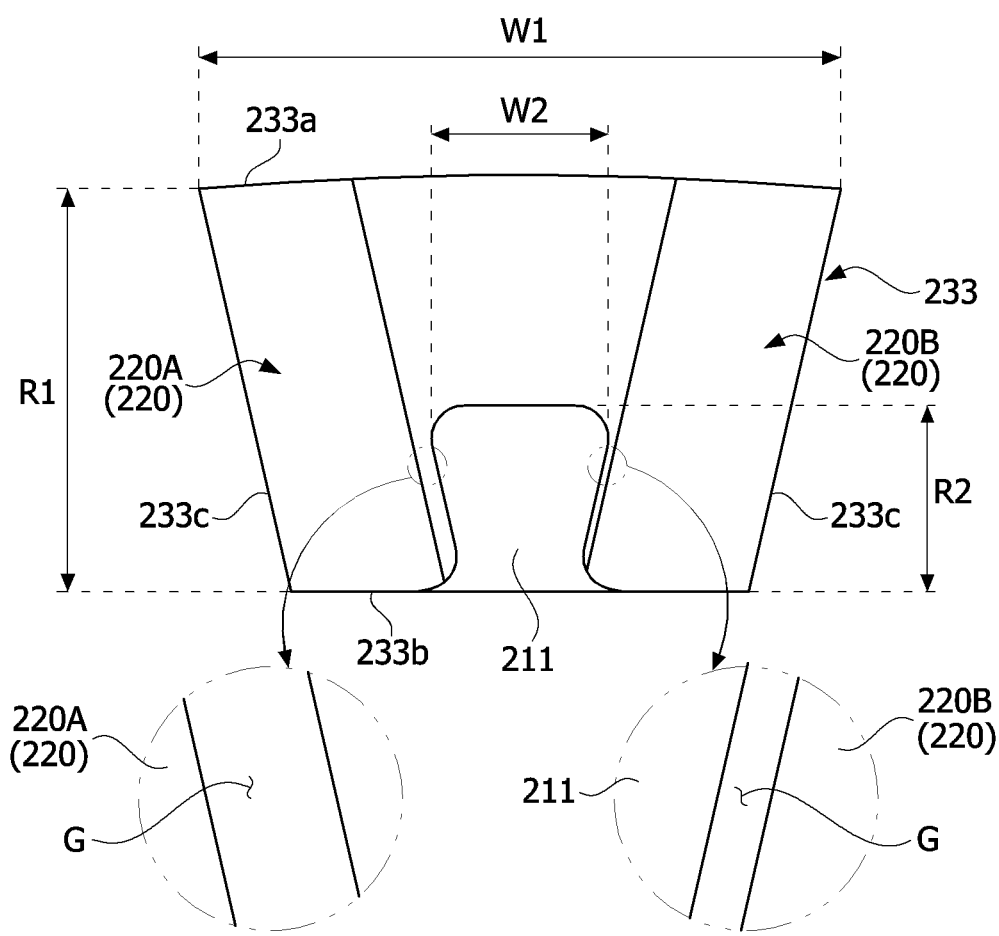

[FIG. 9]
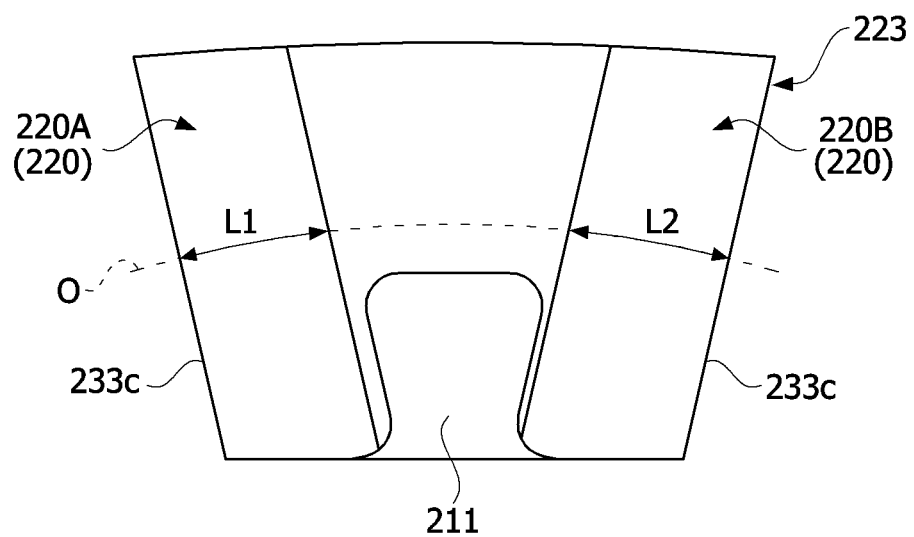

[FIG. 10]
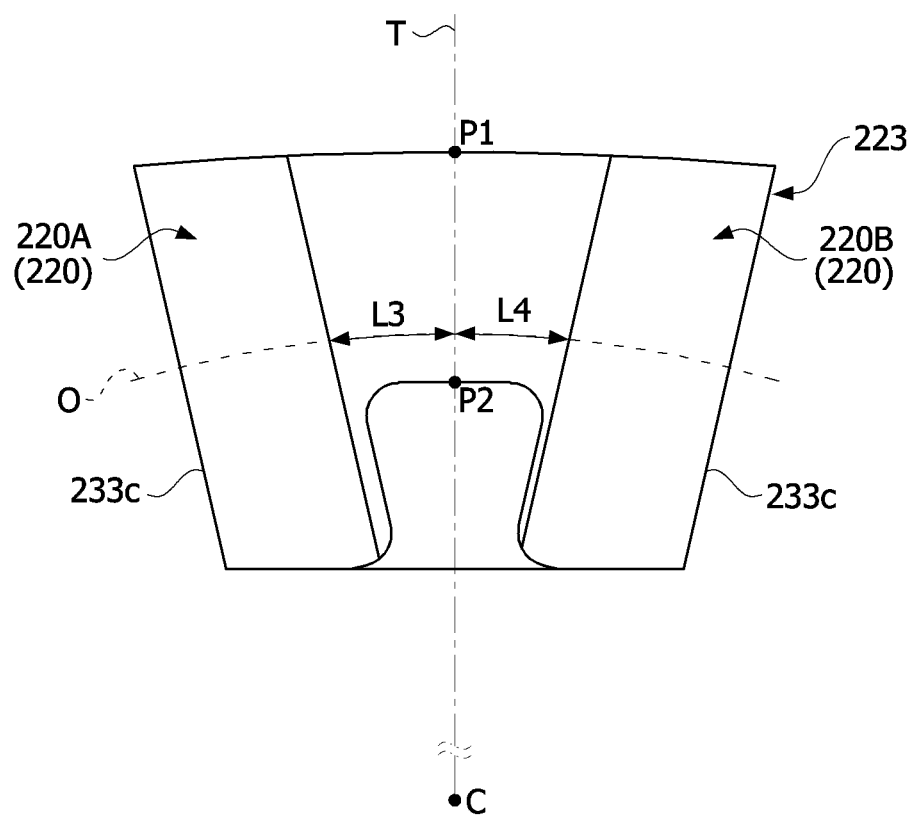

[FIG. 11]
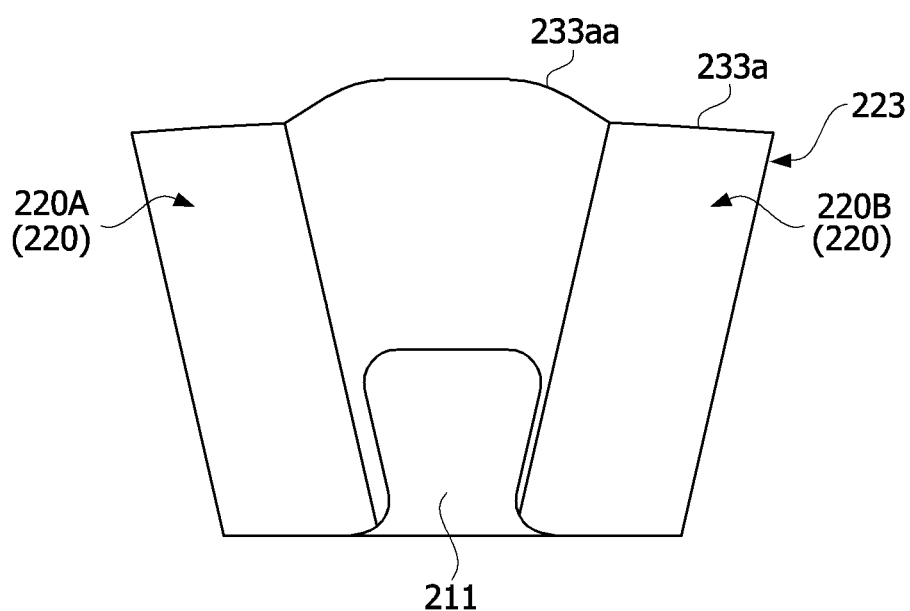

[FIG. 12]
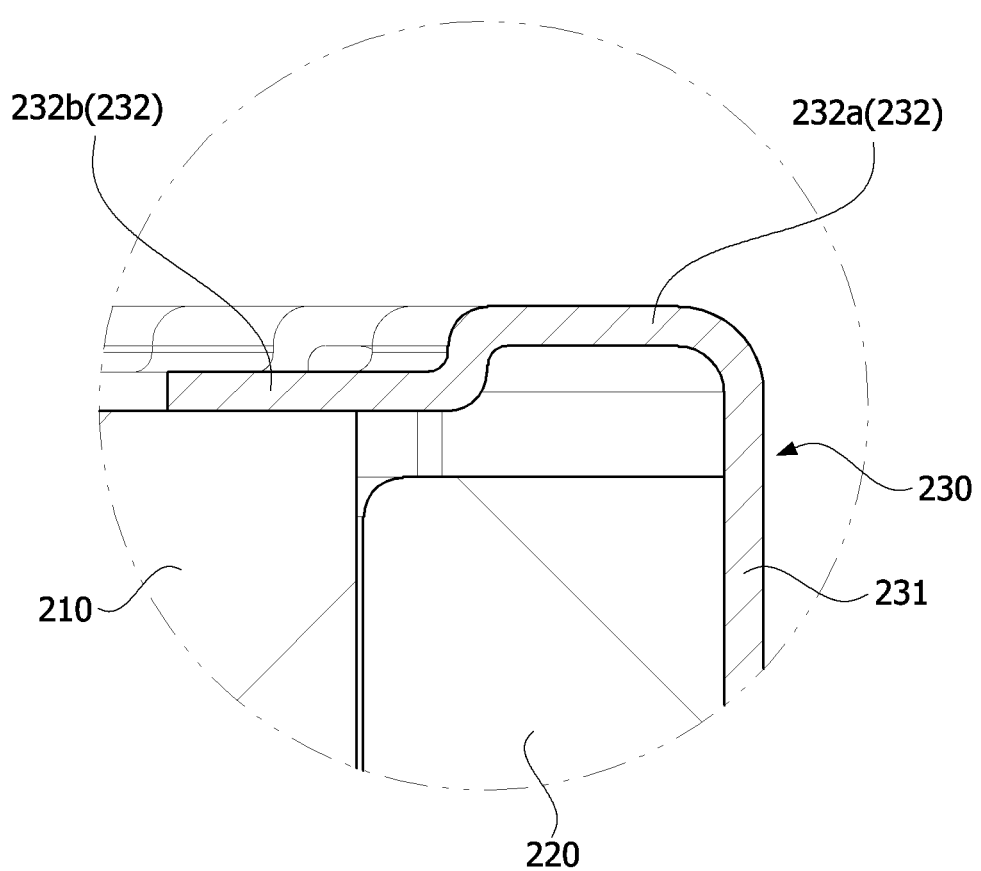

[FIG. 13]
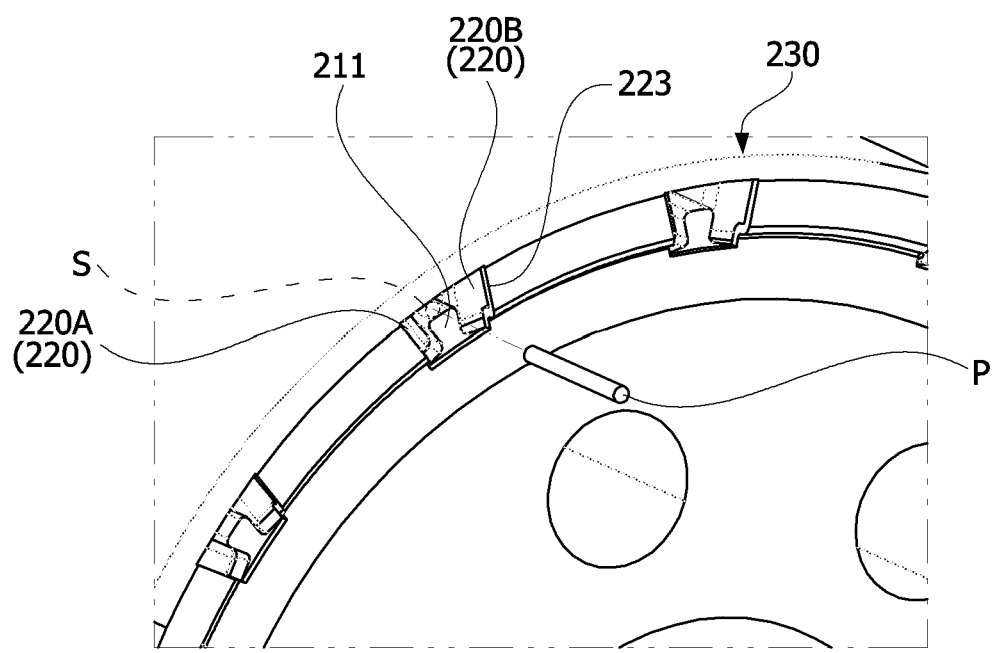

[FIG. 14]
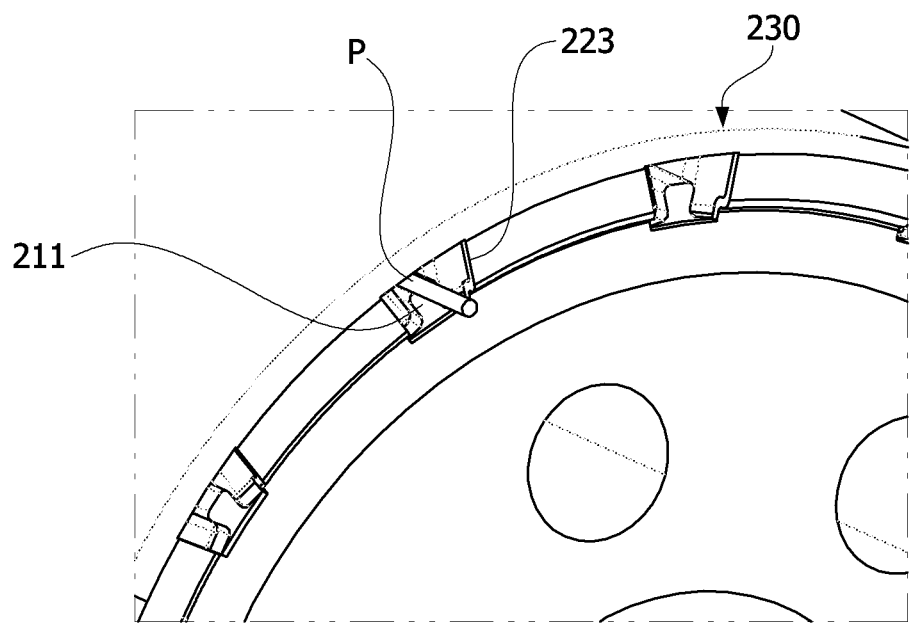

[FIG. 15]
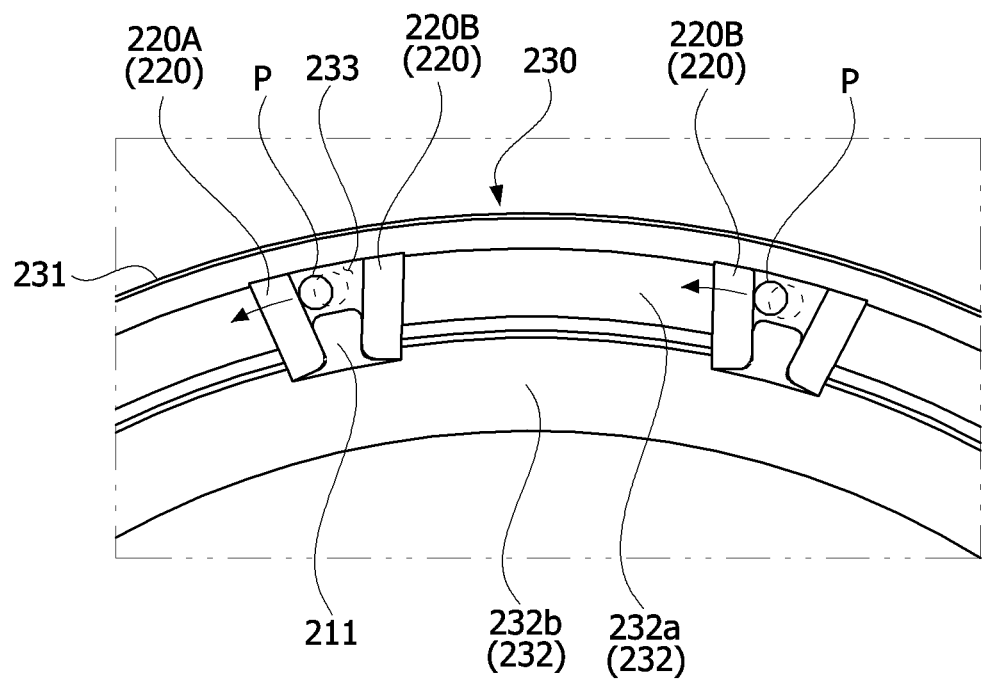

[FIG. 16]
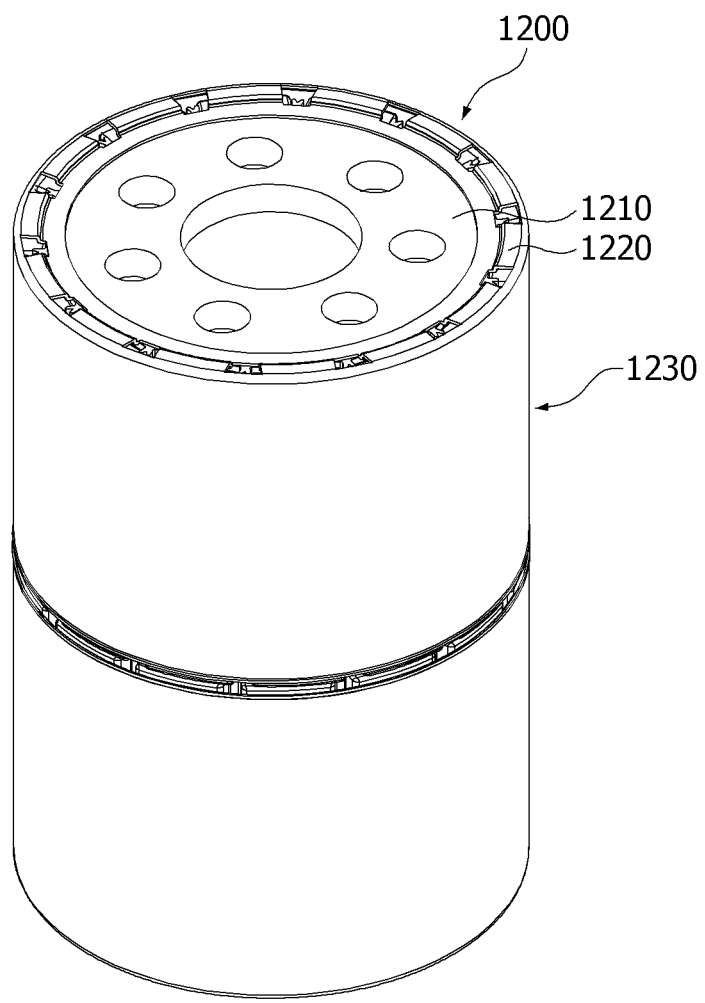

[FIG. 17]
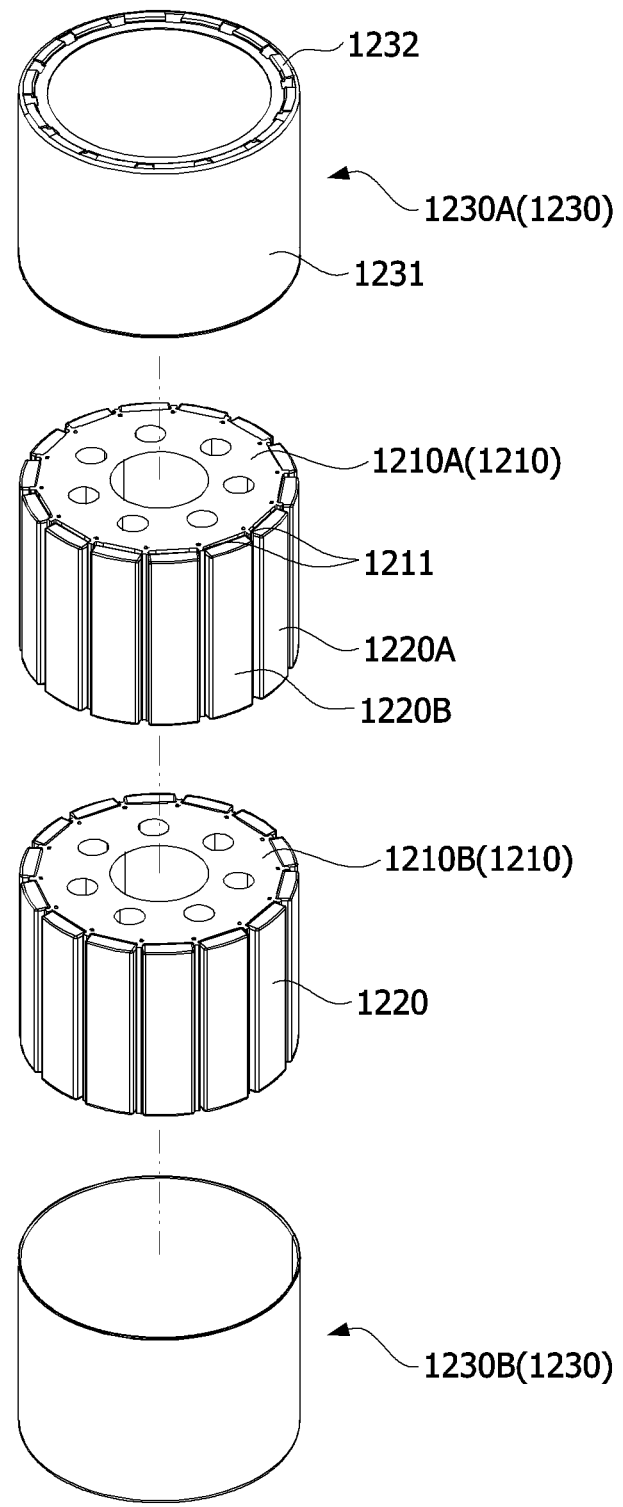

[FIG. 18]
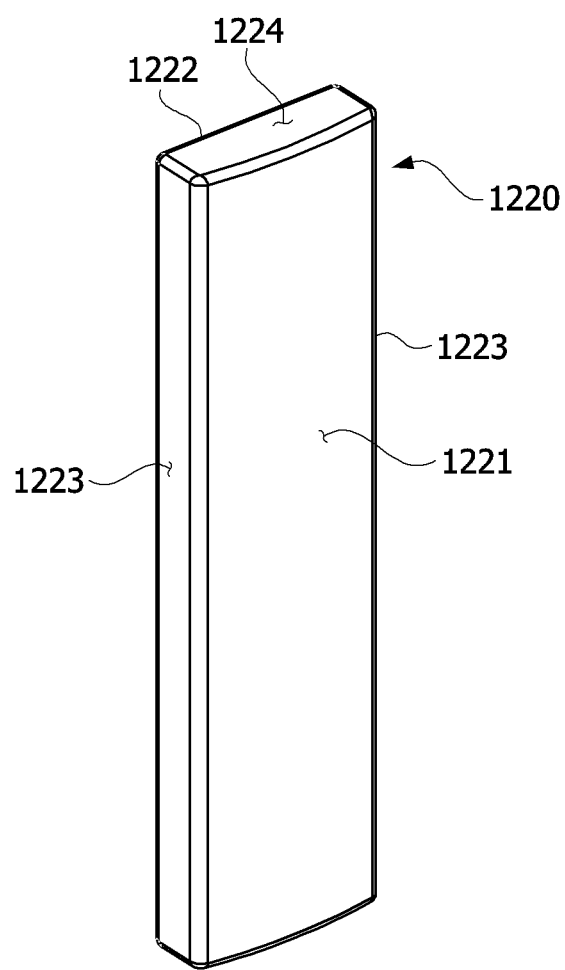

[FIG. 19]
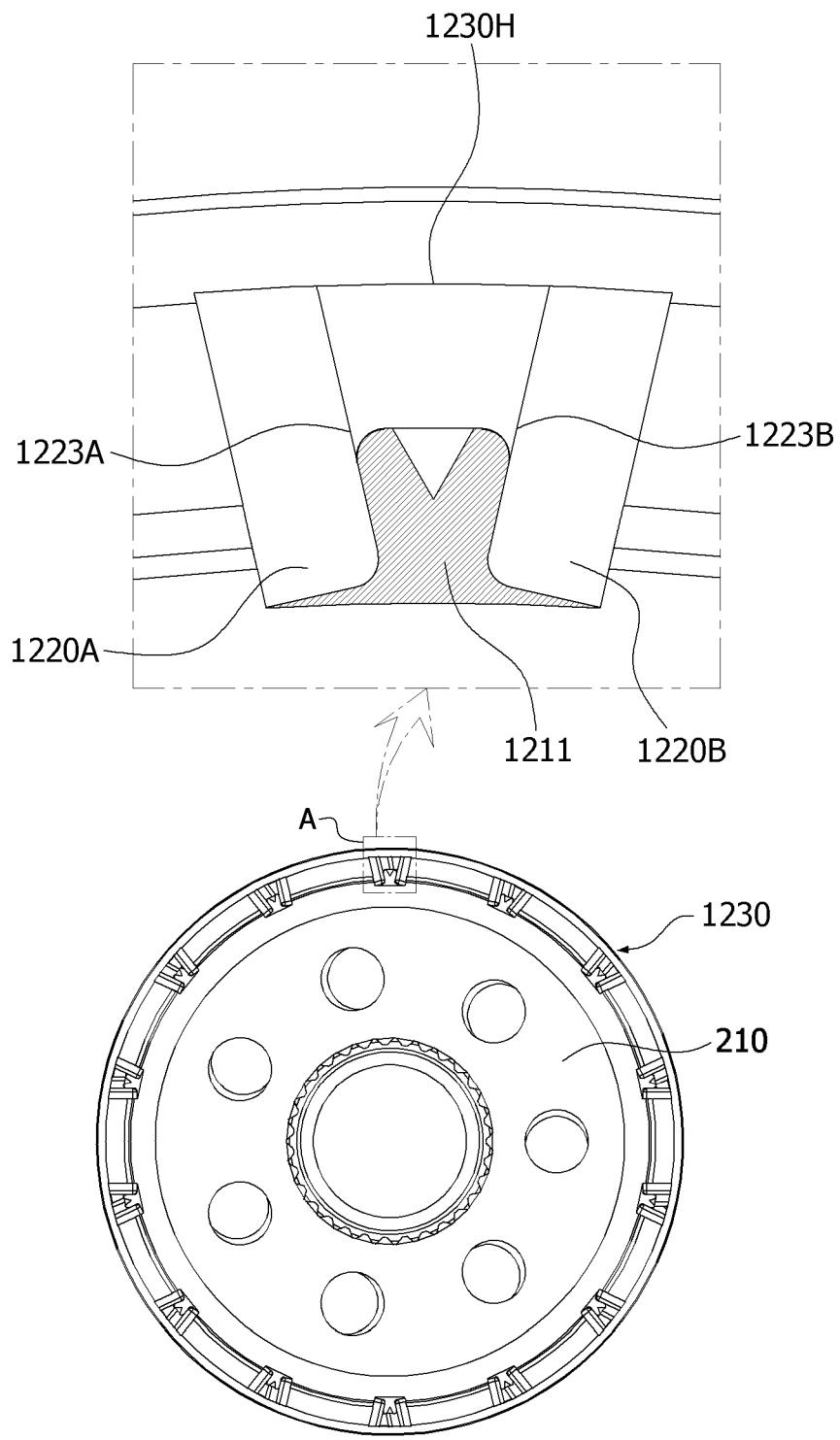

[FIG. 20]
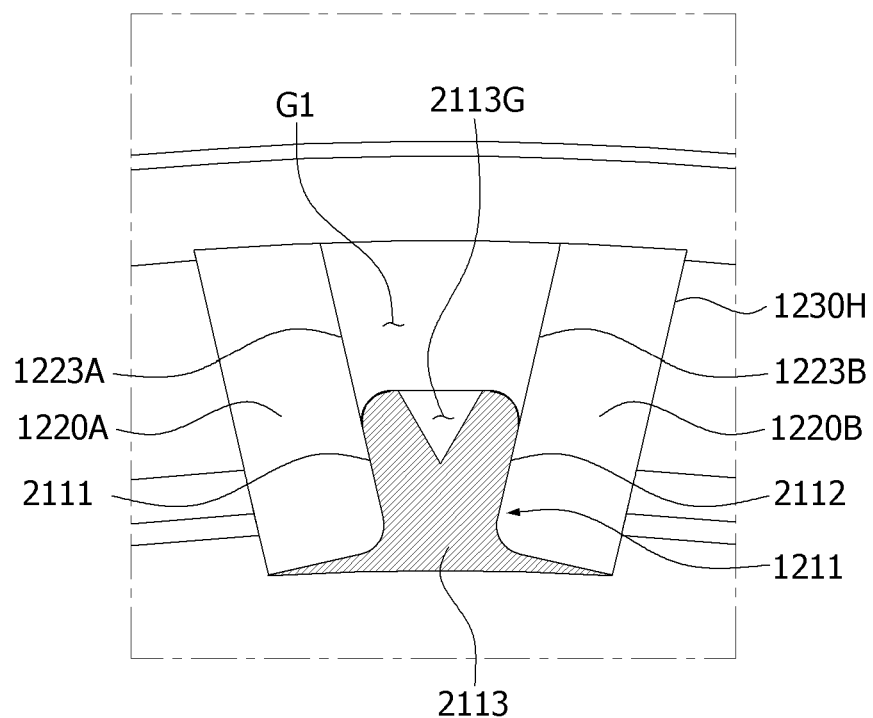

[FIG. 21]
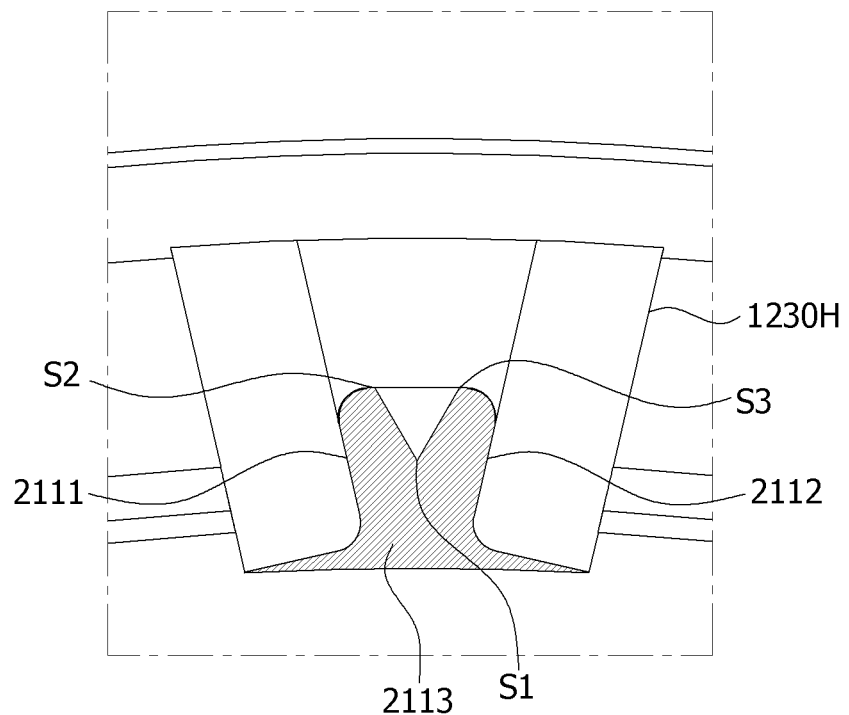

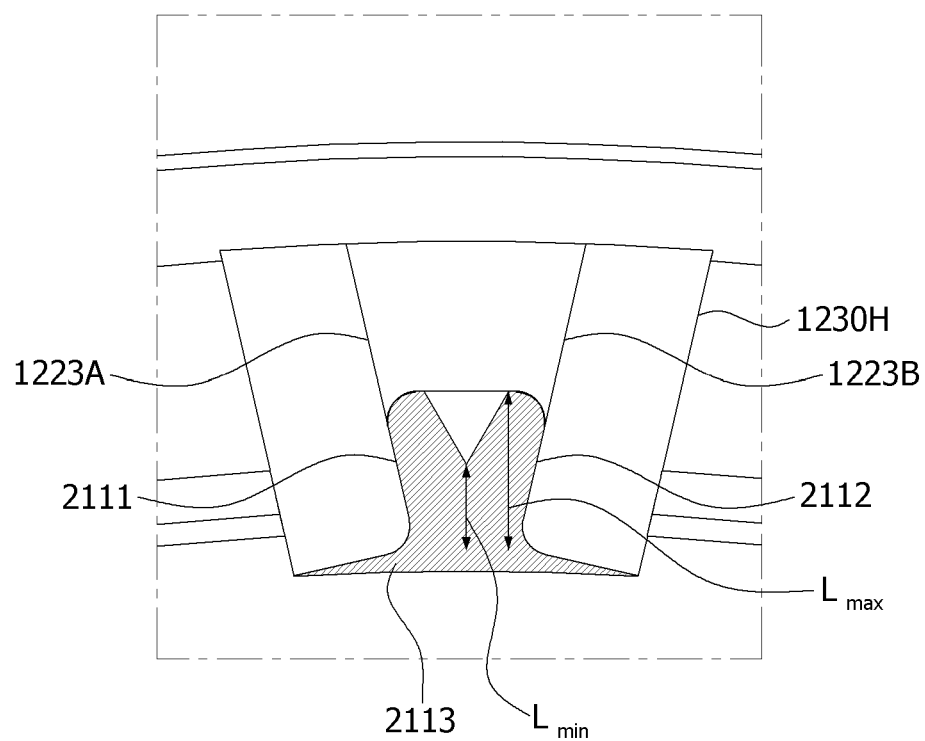
[FIG. 22]

[FIG. 23]
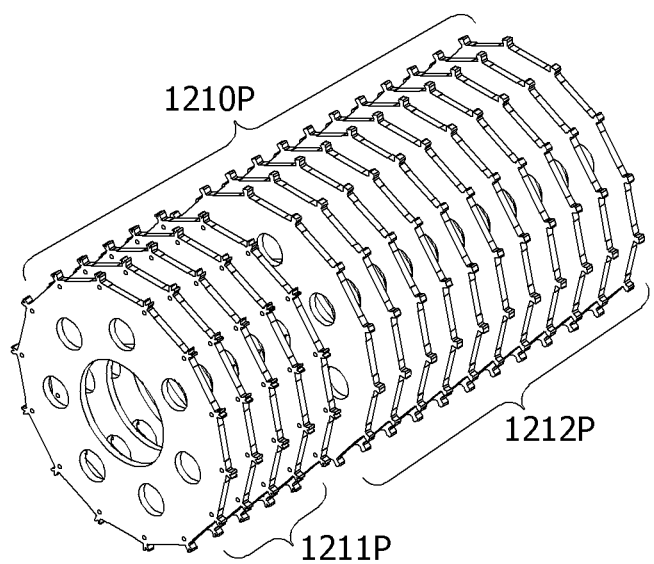

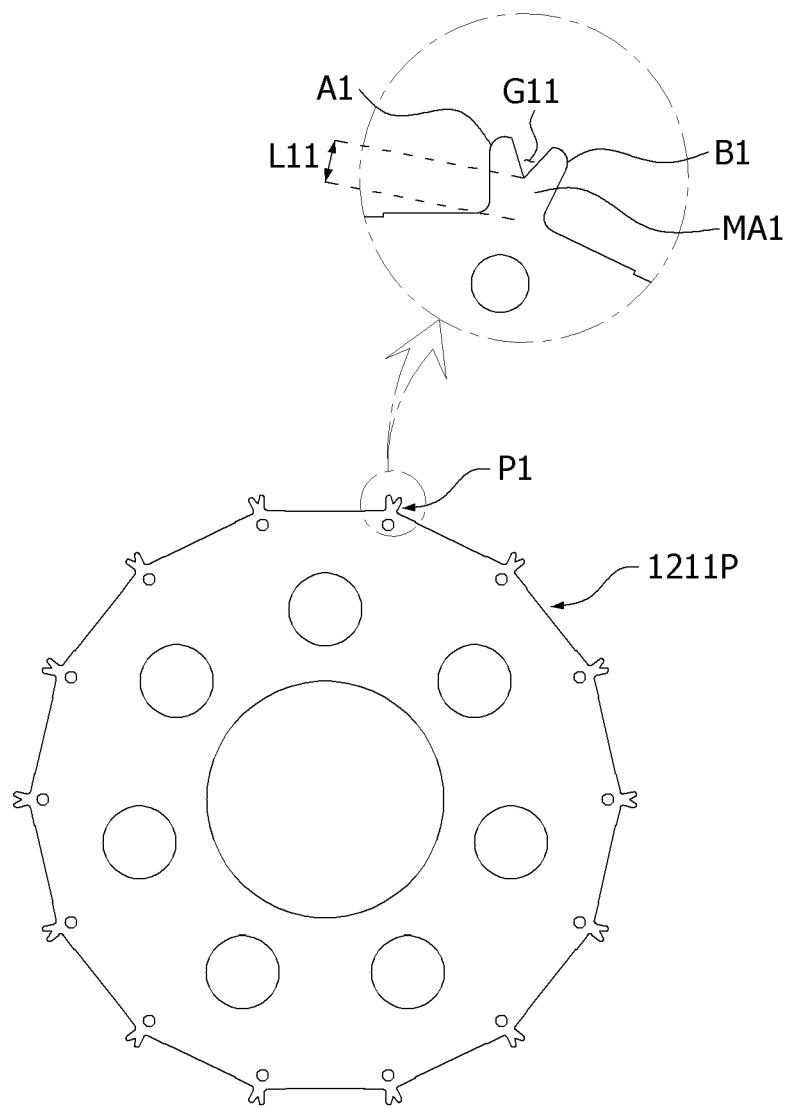
[FIG. 24]

[FIG. 25]
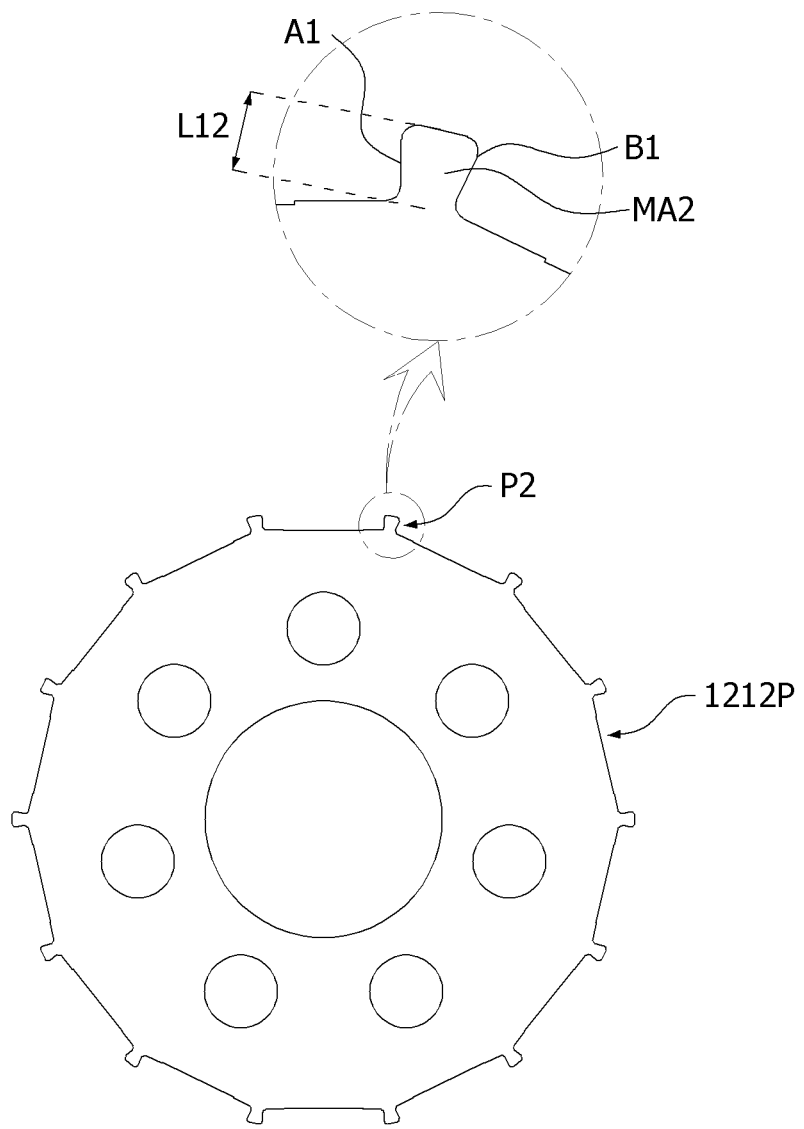

[FIG. 26]
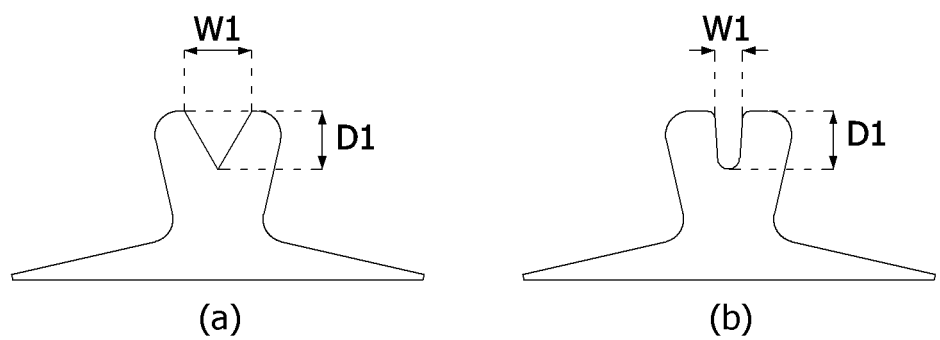

[FIG. 27]
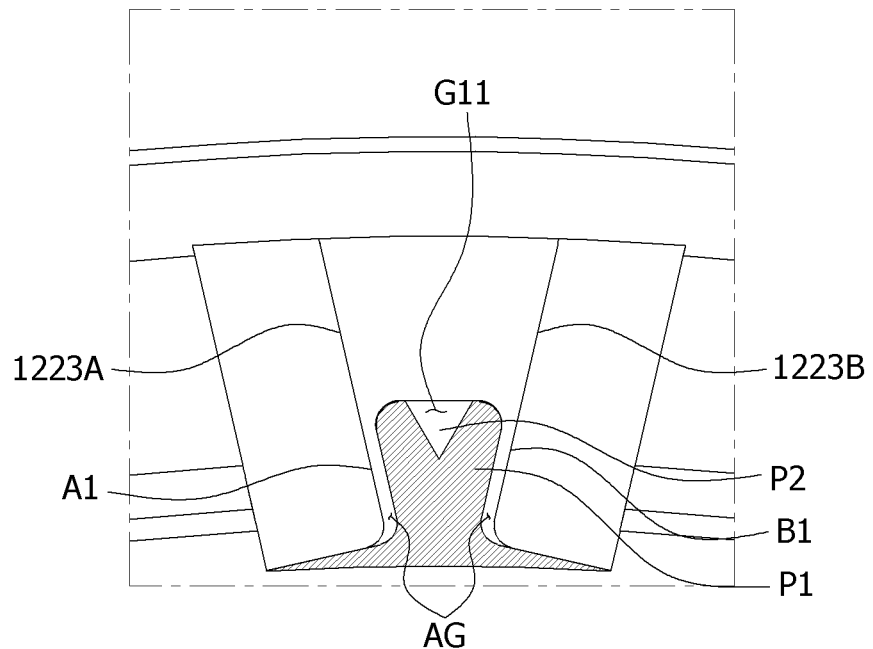

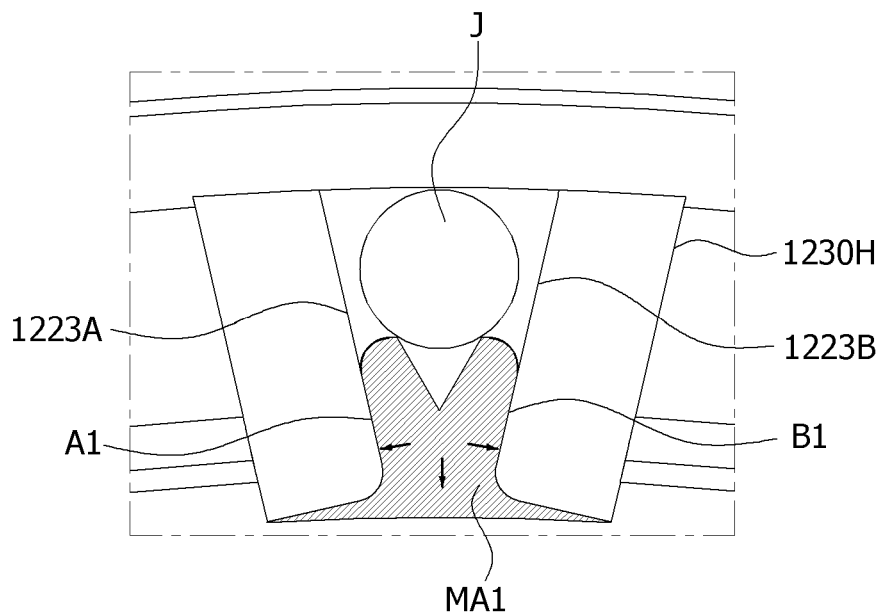
[FIG. 28]

[FIG. 29]
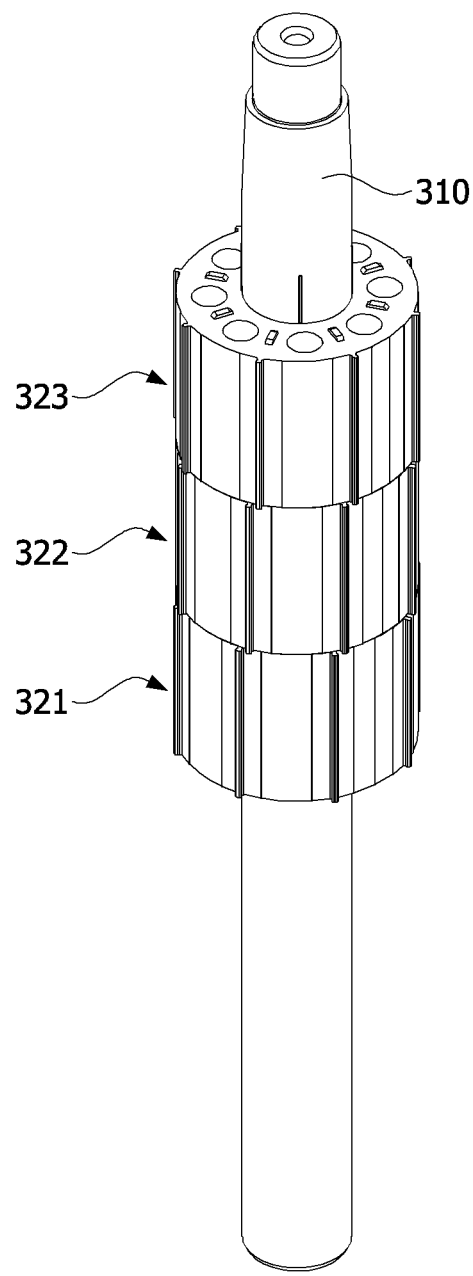

[FIG. 30]
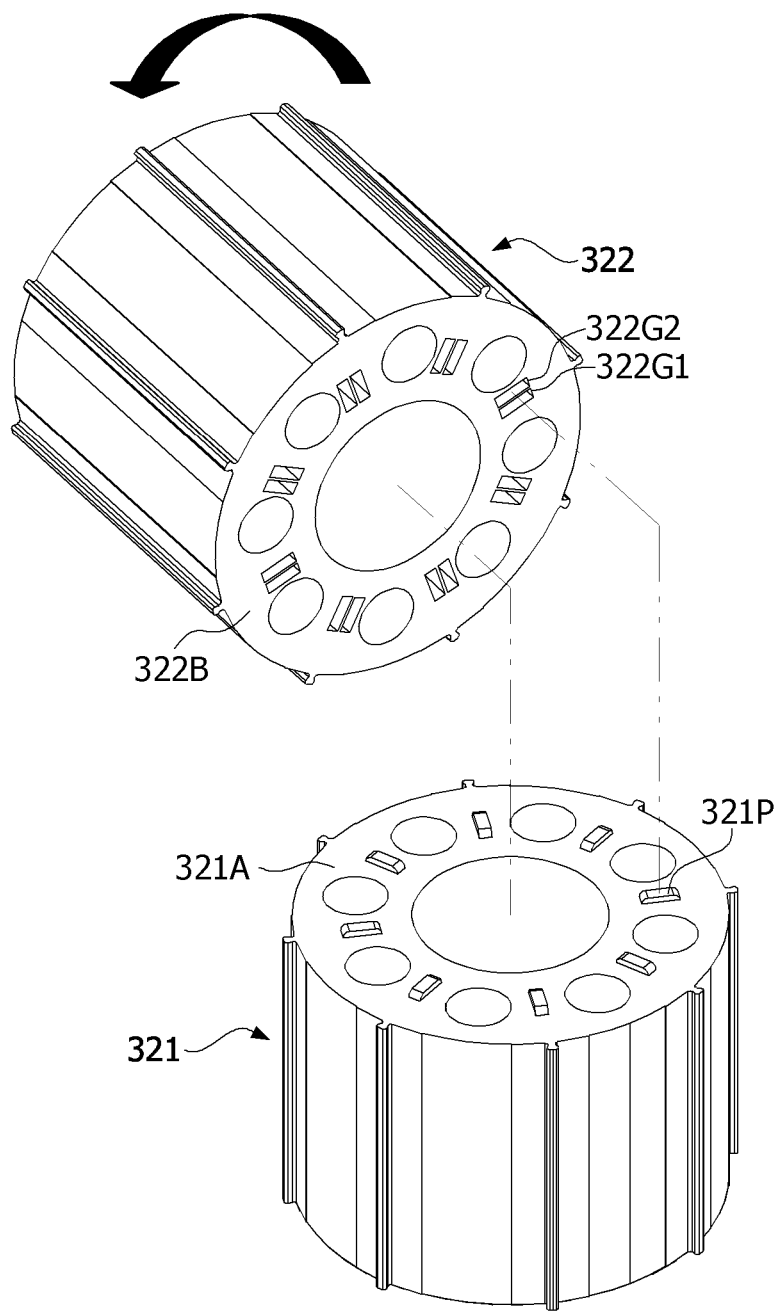

[FIG. 31]
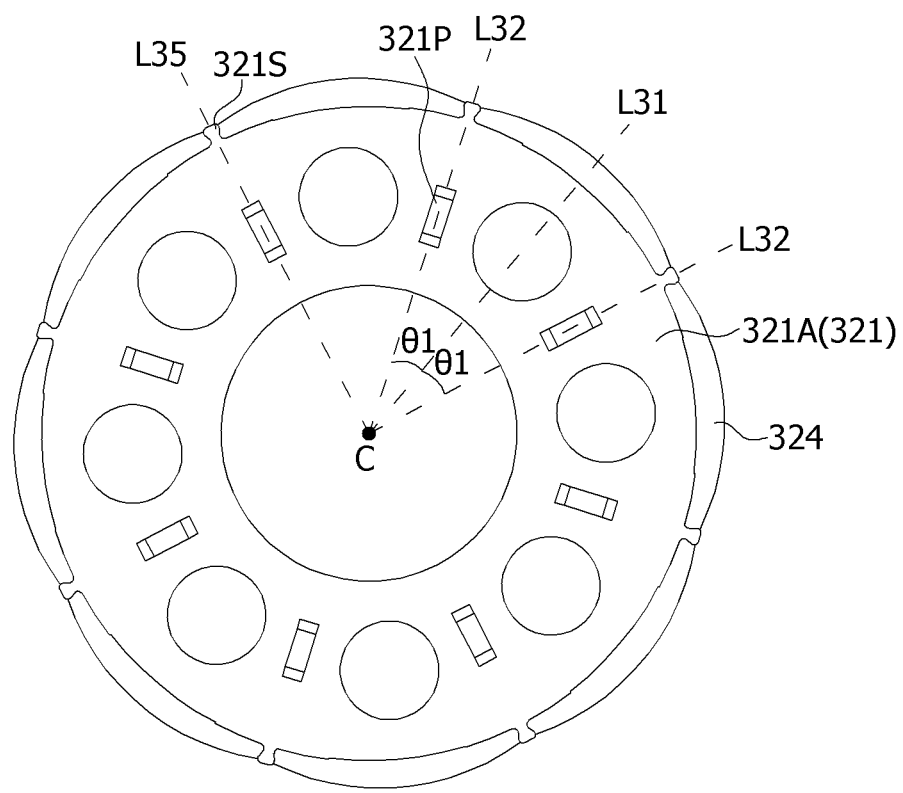

[FIG. 32]
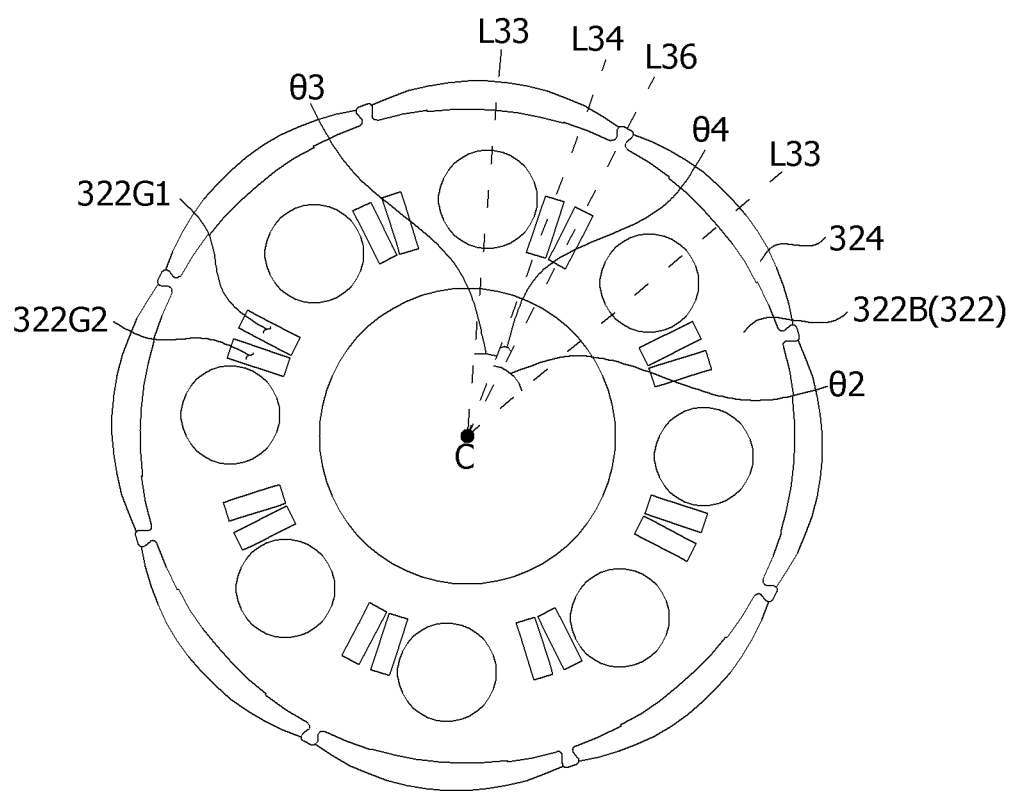

[FIG. 33]
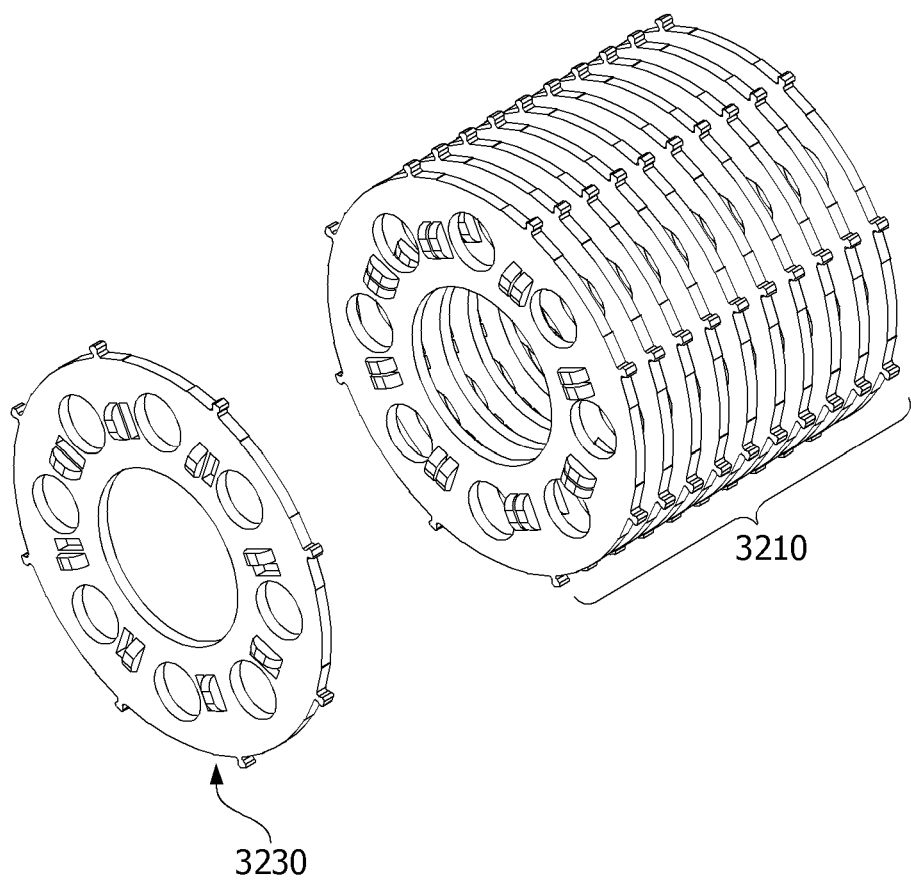

[FIG. 34]
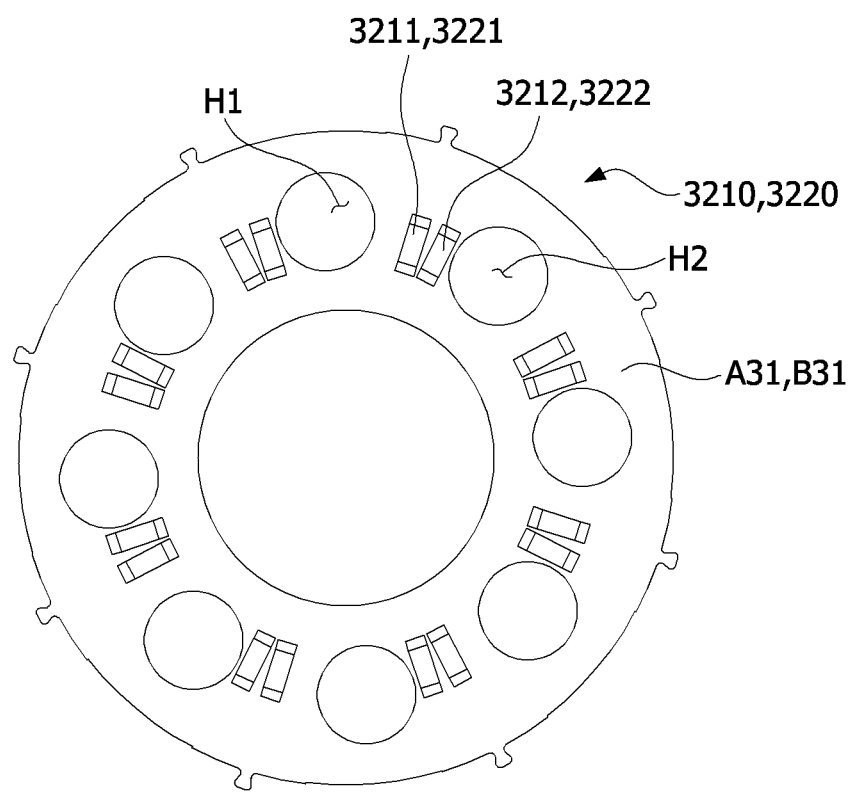

[FIG. 35]
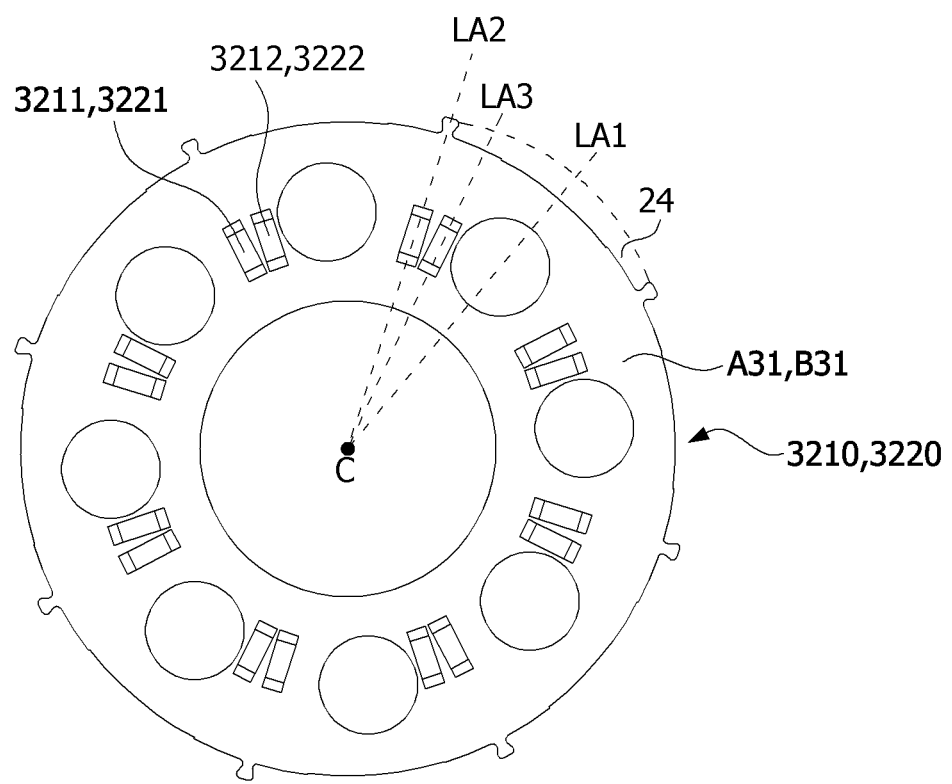

[FIG. 36]
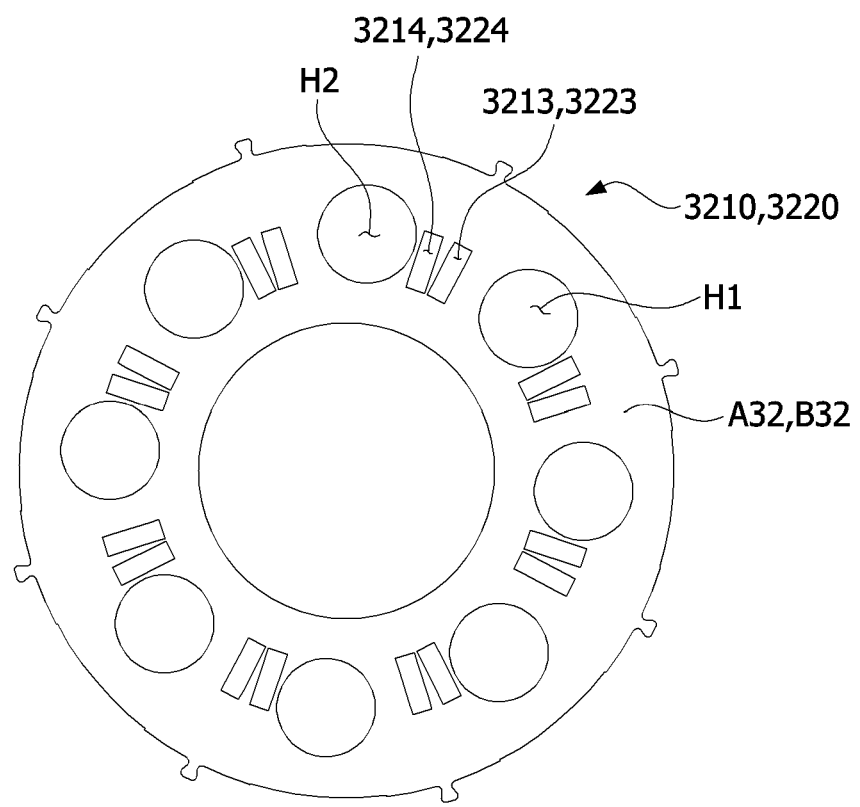

[FIG. 37]
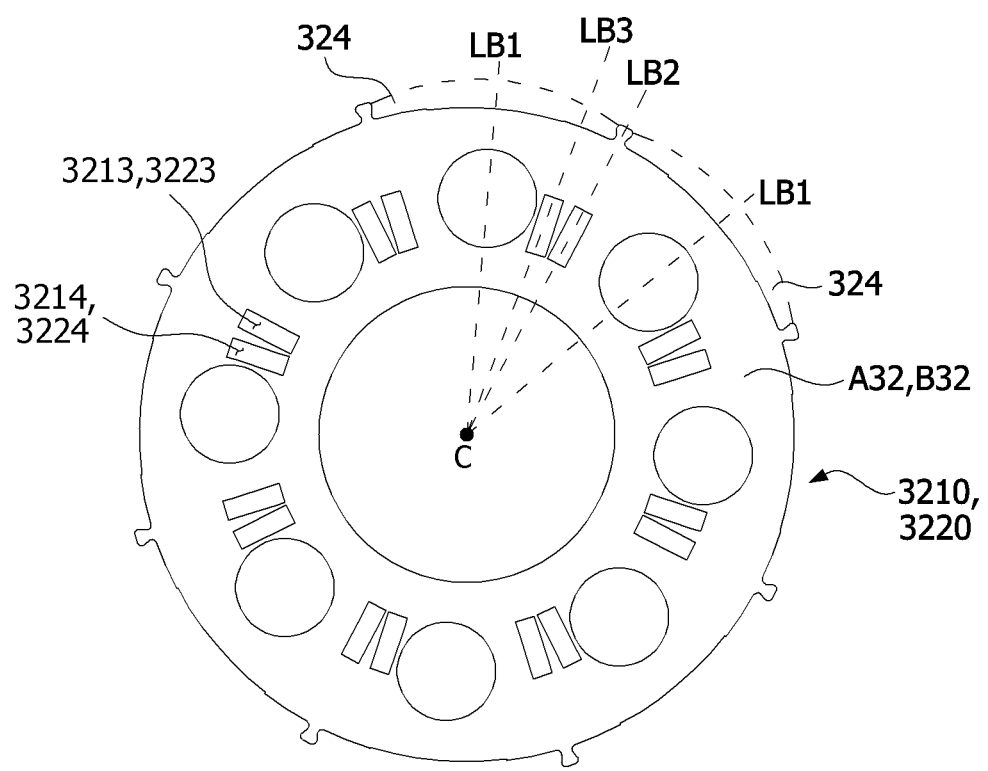

[FIG. 38]
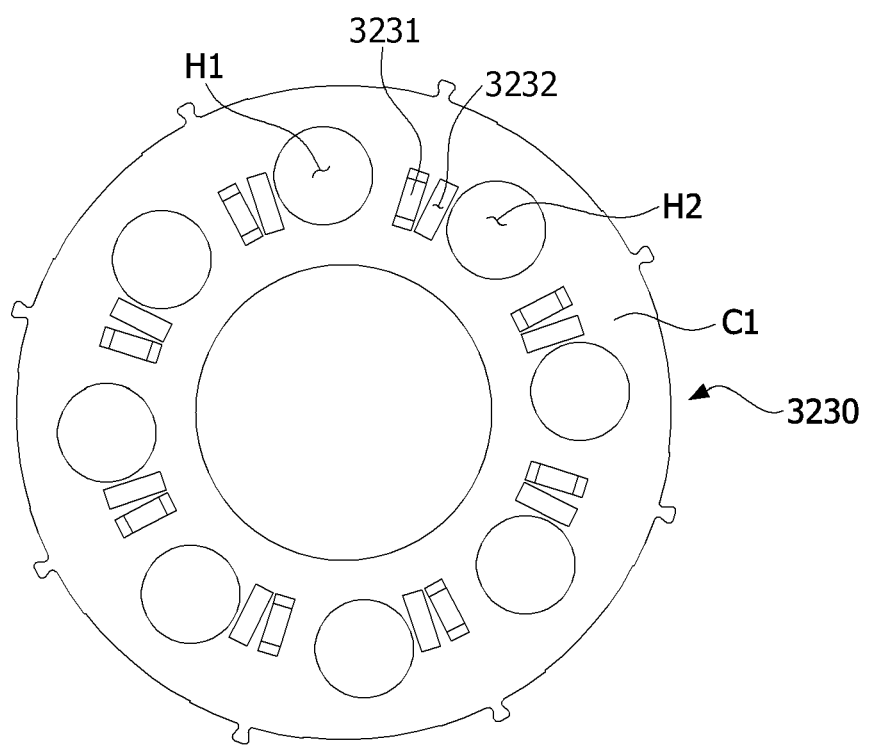

[FIG. 39]
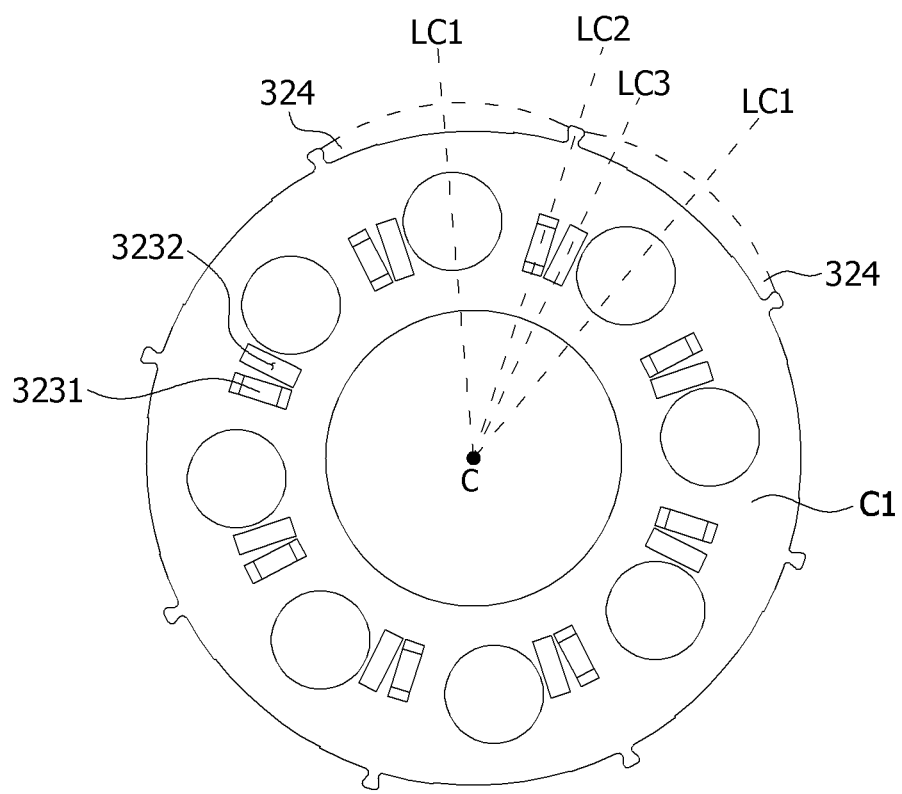

[FIG. 40]
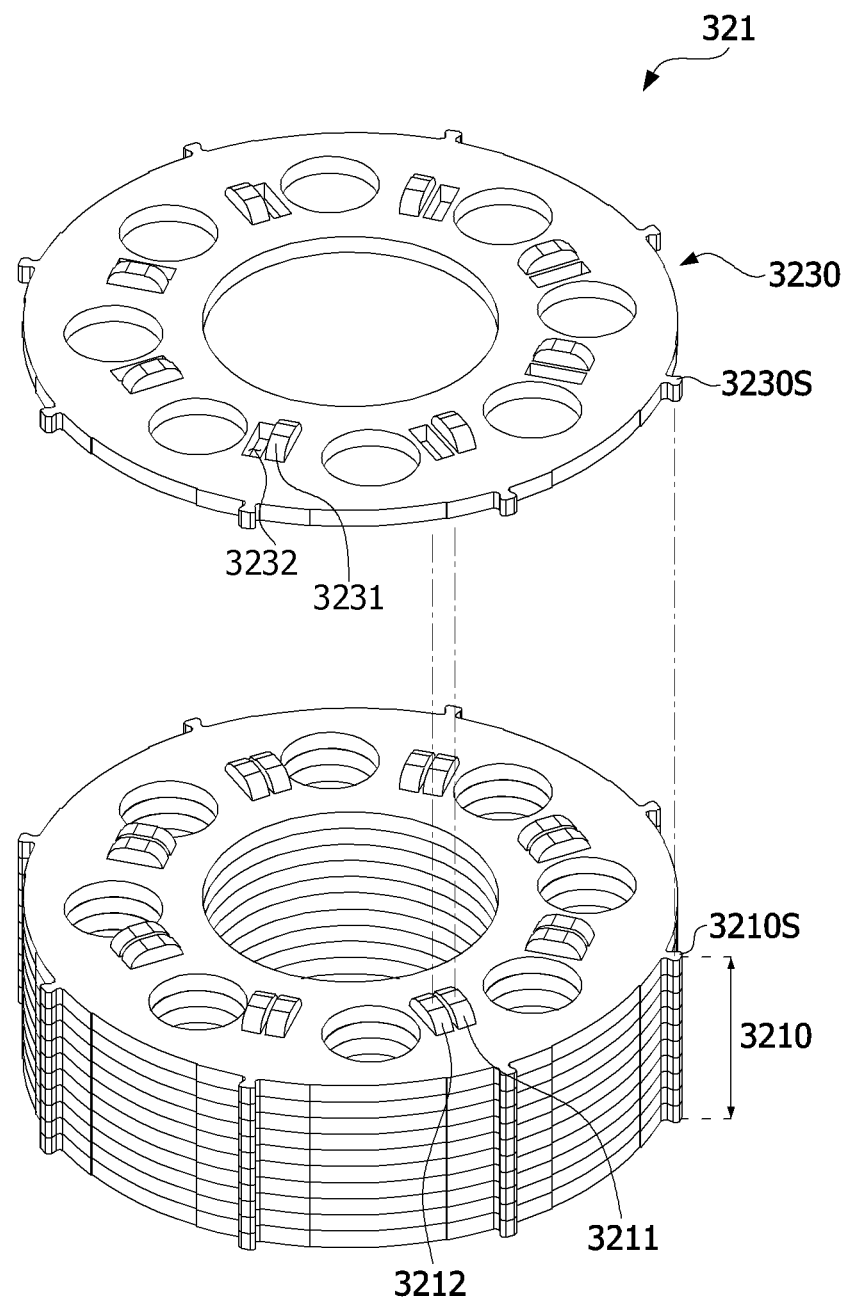

[FIG. 41]
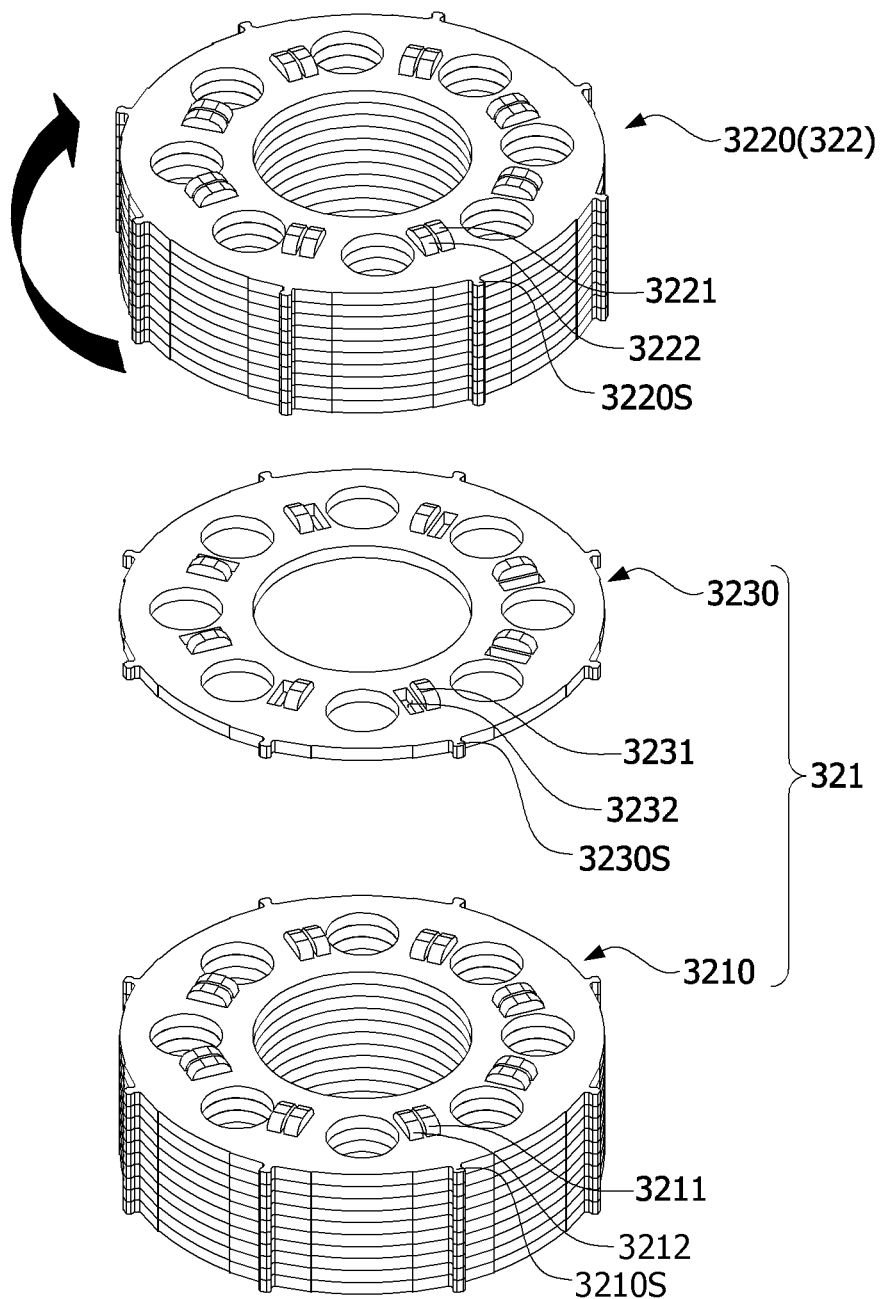

MOTOR

CROSS-REFERENCE TO RELATED PATENT APPLICATIONS

This application is a U.S. National Stage Application under 35 U.S.C. § 371 of PCT Application No. PCT/KR2021/015345, filed Oct. 28, 2021, which claims priority to Korean Patent Application Nos. 10-2020-0141134, filed Oct. 28, 2020, 10-2020-0143159, filed Oct. 30, 2020 and 10-2020-0148430, filed Nov. 9, 2020, whose entire disclosures are hereby incorporated by reference.

TECHNICAL FIELD

The present invention relates to a motor.

BACKGROUND ART

Generally, in a motor, a rotor rotates due to an electromagnetic interaction between a rotor and a stator. In this case, a shaft connected to the rotor also rotates to generate a rotational driving force.

The rotor includes rotor cores and magnets disposed on outer surfaces of the rotor cores. In addition, the rotor may include magnet holders surrounding the rotor cores and the magnets. The magnet holders may be cylindrical can members formed of a metal material.

The rotor cores may include protrusions, and the plurality of magnets may be disposed between the protrusions. However, since circumferential widths between the protrusions are designed to be greater than circumferential widths of the magnets in order to insert the magnets between the protrusions, gaps are present between the magnets and the protrusions in a circumferential direction. Since distances between the magnets may vary in the circumferential direction due to the gaps, all the magnets are pushed clockwise or counterclockwise to set a constant distance between the magnets in the circumferential direction.

In order to push all the magnets clockwise or counterclockwise, after the magnet holders are mounted, the magnet holders are pushed clockwise or counterclockwise to arrange the magnets. There is a problem that the magnet holders frequently make mistakes without pushing the magnets.

In addition, when the magnet holders are mounted, there is a problem that it is difficult to check whether the magnets are arranged because the magnets are not visible from the outside.

Meanwhile, when the rotor rotates at a high speed, a slip may occur between the rotor cores. Accordingly, there are problems of an unstable operation of the rotor and the performance degradation of the motor.

DISCLOSURE

Technical Problem

Accordingly, the present invention is intended to address the above problems and directed to providing a motor in which the arrangement of the magnets is checked after magnets are arranged in a state in which magnet holders are mounted, a slip torque between contact surfaces of rotor cores increases to prevent the rotor cores from slipping, and an operation of a rotor is stable.

Objectives to be achieved through the present invention are not limited to the above-described objectives, and other objectives which are not described above will be clearly understood by those skilled in the art through the following descriptions.

Technical Solution

One aspect of the present invention provides a motor including a shaft, a rotor coupled to the shaft, and a stator disposed to correspond to the rotor, wherein the rotor includes a rotor core, a plurality of magnets coupled to the rotor core, and a magnet holder disposed outside the magnets, the rotor core includes protrusions disposed between the adjacent magnets, the magnet holder includes a first part disposed on a side surface of each of the magnets and a second part connected to the first part and disposed on one surface of the magnet, the second part includes holes, and a part of each of the protrusions and a part of the magnet are exposed through one of the holes.

The plurality of holes may be disposed at predetermined intervals in a circumferential direction, and each of the holes may be disposed to correspond to one of the protrusions.

A maximum circumferential width of the holes may be greater than a maximum circumferential width of the protrusion.

A maximum radial length of the hole may be greater than a maximum radial length of the protrusion.

In the circumferential direction, a first magnet disposed at one side of the protrusion and a second magnet disposed at the other side of the protrusion may be exposed through the hole.

One surface and the side surface of the magnet may be exposed through the hole.

In the circumferential direction, a first distance which is a circumferential distance between a side surface of the hole and the side surface of the exposed first magnet may be different from a second distance which is a circumferential distance between the side surface of the hole and the side surface of the exposed second magnet.

A third distance which is a circumferential distance between a reference line, which crosses a circumferential width center of the hole and an axial center of the shaft, and the exposed side surface of the first magnet may be different from a fourth distance which is a circumferential distance between the reference line and the exposed side surface of the second magnet.

The second part may include a 2A part and a 2B part connected to the 2A part, the 2A part may be bent from the first part and disposed to be spaced apart from the protrusion and the magnet in the axial direction, and the 2B part may be bent from the 2A part to be in contact with the rotor core.

A part of the hole may be disposed in the 2A part, and the other part of the hole may be disposed in the 2B part.

Another aspect of the present invention provides a motor including a shaft, a rotor coupled to the shaft, and a stator disposed to correspond to the rotor, wherein the rotor includes a rotor core, a plurality of magnets coupled to the rotor core, and a magnet holder disposed outside the magnets, the magnets includes a first magnet and a second magnet spaced apart from the first magnet in a circumferential direction, the rotor core includes protrusions each disposed between the first magnet and the second magnet, the protrusion includes a first surface facing the first magnet, a second surface facing the second magnet, and a first region disposed between the first surface and the second surface, the first region includes a first portion, a second portion disposed between the first portion and the first surface, and a third portion disposed between the first portion and the second surface, a radial length of the first portion is smaller than a radial length of the second portion or the third portion, and the magnet holder includes holes axially overlapping the protrusions in an axial direction.

The protrusion may include a groove disposed between the second portion and the third portion.

The plurality of holes may be disposed at predetermined intervals in the circumferential direction, and each of the holes may be disposed to correspond to one of the protrusions.

The first magnet may include a first side surface facing the second magnet, the second magnet may include a second side surface facing the first side surface, and the first side surface and the second side surface may overlap the hole in the axial direction.

The protrusion, the first side surface, and the second side surface may form a first space, and the first space may overlap the hole in the axial direction.

The magnet holder may include a first part disposed on a side surface of the magnet and a second part connected to the first part and disposed on one surface of the magnet, and the second part may include the hole.

The rotor core may include a plurality of rotor plates stacked in the axial direction, the rotor plates may include a first rotor plate and a second rotor plate, and the first rotor plate may be disposed closer to the second part than the second rotor plate.

The first rotor plate may include a plurality of first protrusions protruding from an outer circumferential surface in the circumferential direction, and the second rotor plate may include a plurality of second protrusions protruding from an outer circumferential surface in the circumferential direction, and a shape of the first protrusion may be different from a shape of the second protrusion.

The first protrusion may include a 1A surface facing the first side surface, a 2A surface facing the second side surface, and a 1A region disposed between the 1A surface and the 2A surface, and a first groove may be formed in the 1A region.

The second protrusion may include a 1B surface facing the first side surface, a 2B surface facing the second side surface, and a 1B region disposed between the 1B surface and the 2B surface, and a minimum radial length of the 1B region may be greater than a minimum radial length of the 1A region.

Still another aspect of the present invention provides a motor including a shaft, a rotor coupled to the shaft, and a stator disposed to correspond to the rotor, wherein the rotor includes a rotor core and a plurality of magnets coupled to the rotor core, the rotor core includes a first rotor core and a second rotor core disposed in an axial direction from the first rotor core, the first rotor core includes a first surface in contact with the first rotor core and a protrusion disposed on the first surface, the second rotor core includes a second surface in contact with the first surface, a first groove disposed in the second surface, and a second groove disposed in a circumferential direction from the first groove, and the protrusion is disposed in the second groove.

A first arrangement angle between a first virtual line crossing a width center of the magnet from an axial center of the first rotor core and a second virtual line crossing a width center of the protrusion from the axial center of the first rotor core may be different form a second arrangement angle between a third virtual line crossing the width center of the magnet from an axial center of the second rotor core and a fourth virtual line crossing a width center of the second groove from the axial center of the second rotor core.

The first rotor core may include a plurality of first protruding parts disposed on an outer circumferential surface of the first rotor core in the circumferential direction, and the second virtual line may overlap a fifth virtual line crossing a width center of the first protruding part from the axial center of the first rotor core.

The second rotor core may include a first hole and a second hole spaced apart from the first hole in the circumferential direction, and the first groove and the second groove may be disposed between the first hole and the second hole in the circumferential direction.

The first rotor core may include a plurality of first rotor plates stacked in the axial direction, the first rotor plate may include a 1A surface, a 2A surface, and a 1A protrusion and a 2A protrusion disposed on the 1A surface, and a 1A groove and a 2A groove may be formed in the 2A surface.

The 1A groove may be formed when the 1A protrusion protrudes, and the 2A groove may be formed when the 2A protrusion protrudes.

The second rotor core may include a plurality of second rotor plates stacked in the axial direction, the second rotor plate may include a 1B surface, a 2B surface, and a 1B protrusion and a 2B protrusion disposed on the 1B surface, and a 1B groove and a 2B groove may be formed in the 2B surface.

The 1B groove may be formed when the 1B protrusion protrudes, and the 2B groove may be formed when the 2B protrusion protrudes.

The 1A protrusion may overlap the 2B groove of the second rotor core in the axial direction.

The first rotor core may include a third rotor plate disposed between the first rotor plate and the second rotor plate.

The third rotor plate may include a 1C surface disposed toward the 2B surface, a 2C surface disposed toward the 1A surface, a 1C protrusion disposed on the 1C surface, and a 1C hole passing through the 1C surface and the 2C surface.

The 1B protrusion may be disposed in the 1C hole, and the 1C protrusion may be disposed in the 2B groove and may overlap the 2B protrusion in the axial direction.

The protrusion may have a radial length greater than a circumferential width.

The radial length of the protrusion is smaller than a radial length of the rotor core, and a ratio of the radial length of the protrusion to the radial length of the rotor core may be 0.25 to 0.4.

Advantageous Effects

According to an embodiment, an advantageous effect of arranging magnets in a state in which magnet holders are mounted is provided.

According to an embodiment, an advantageous effect of checking an arrangement of magnets in a state in which magnet holders are mounted is provided.

According to an embodiment, an advantageous effect of checking a state of magnets and a state of an adhesive after magnet holders are mounted is provided.

According to an embodiment, a fixing force of magnets can be improved to prevent a cogging torque of a motor from degrading due to misalignment of the magnets.

According to an embodiment, a slip torque between rotor cores can increase to prevent a slip phenomenon and stabilize an operation of a rotor.

In addition, since a skew angle can be adjusted while plates are stacked, work efficiency increases, and since protrusions are inserted into grooves or holes and rotor plates are stacked, a coupling force between the rotor plates increases.

DESCRIPTION OF DRAWINGS

FIG. 1 is a side cross-sectional view illustrating a motor according to an embodiment.

FIG. 2 is an exploded view illustrating a rotor.

FIG. 3 is a side cross-sectional view illustrating a part of the rotor illustrated in FIG. 2.

FIG. 4 is a view illustrating a rotor core and magnets.

FIG. 5 is a perspective view illustrating a magnet.

FIG. 6 is a view illustrating a magnet holder.

FIG. 7 is a ground plan illustrating the magnet holder illustrated in FIG. 6.

FIGS. 8 to 10 are views illustrating a protrusion and magnets exposed through a hole.

FIG. 11 is a view illustrating a hole according to another embodiment.

FIG. 12 is a side cross-sectional view illustrating the magnet holder illustrated in FIG. 6.

FIG. 13 is a view illustrating a state in which a pin of an external device is aligned with the hole of the magnet holder.

FIG. 14 is a view illustrating a state in which the pin of the external device is inserted into the hole.

FIG. 15 is a view illustrating a process of aligning the magnets using the pin.

FIG. 16 is a perspective view illustrating a rotor of a motor according to another embodiment.

FIG. 17 is an exploded perspective view illustrating the rotor.

FIG. 18 is a perspective view illustrating a magnet.

FIG. 19 is a plan view illustrating the rotor.

FIGS. 20 to 22 are enlarged views illustrating region A of FIG. 19.

FIG. 23 is an exploded perspective view illustrating a rotor core.

FIG. 24 is a plan view illustrating a first rotor plate.

FIG. 25 is a plan view illustrating a second rotor plate.

FIGS. 26 (*a*) and (*b*) are a set of views illustrating a first protrusion according to a modified embodiment.

FIG. 27 is a view illustrating a state before the first protrusion is deformed.

FIG. 28 is a view illustrating a state in which the first protrusion is deformed.

FIG. 29 is a view illustrating a state in which a shaft is coupled to rotor cores of a motor according to still another embodiment.

FIG. 30 is a view illustrating a state in which a first rotor core and a second rotor core are being stacked.

FIG. 31 is a plan view illustrating the first rotor core.

FIG. 32 is a bottom view illustrating the second rotor core.

FIG. 33 is an exploded perspective view illustrating the first rotor core.

FIGS. 34 and 35 are plan views illustrating a first rotor plate and a second rotor plate.

FIGS. 36 and 37 are bottom views illustrating the first rotor plate and the second rotor plate.

FIG. 38 and FIG. 39 are plan views illustrating a third rotor plate.

FIG. 40 is a view illustrating a state in which a plurality of first rotor plates and the third rotor plate are being stacked.

FIG. 41 is a view illustrating a state in which the plurality of first rotor plates, a plurality of second rotor plates, and the third rotor plate are being stacked.

MODES OF THE INVENTION

A direction parallel to a longitudinal direction (vertical direction) of a shaft is referred to as an axial direction, a direction perpendicular to the axial direction based on the shaft is referred to as a radial direction, and a direction along a circle having a radius in the radial direction based on the shaft is referred to as a circumferential direction.

FIG. 1 is a side cross-sectional view illustrating a motor according to an embodiment.

Referring to FIG. 1, the motor according to the embodiment may include a shaft 100, a rotor 200, a stator 300, and a housing 400.

Hereinafter, the term "inward" refers to a direction from the housing 400 toward the shaft 100 which is a center of the motor, and the term "outward" refers to a direction opposite to "inward," that is, a direction from the shaft 100 toward the housing 400.

The shaft 100 may be coupled to the rotor 200. When a current is supplied and an electromagnetic interaction between the rotor 200 and the stator 300 occurs, the rotor 200 rotates and the shaft 100 rotates in conjunction with the rotor 200. The shaft 100 may be formed of a hollow member.

The rotor 200 rotates due to an electrical interaction with the stator 300. The rotor 200 may be disposed to correspond to the stator 300 and may be disposed inside the stator 300. The rotor 200 may include a rotor core 210, a plurality of magnets 220 coupled to the rotor core 210, and a magnet holder 230 disposed outside the magnets 220. The magnet holder 230 may be a can member formed of a metal material.

The stator 300 is disposed outside the rotor 200. The stator 300 may include a stator core 310, an insulator 320, and a coil 330. The insulator 320 is seated on the stator core 310. The coil 330 is mounted on the insulator 320. The coil 330 induces an electrical interaction with the magnets of the rotor 200.

The housing 400 may be disposed outside the stator 300. The housing 400 may be a cylindrical member having one open side.

FIG. 2 is an exploded view illustrating the rotor, and FIG. 3 is a side cross-sectional view illustrating a part of the rotor illustrated in FIG. 2.

Referring to FIGS. 2 and 3, the rotor 200 may include the rotor core 210, the plurality of magnets 220 disposed outside the rotor core 210, and the magnet holder 230 which covers the rotor core 210 and the magnets 220. The rotor core 210 may include a first rotor core 210A and a second rotor core 210B. The first rotor core 210A and the second rotor core 210B may be disposed to be stacked in an axial direction. The magnet holder 230 may include a first magnet holder 230A and a second magnet holder 230B. The first magnet holder 230A may be fitted onto the rotor core 210 from one side of the rotor core 210 in the axial direction, and the second magnet holder 230B may be fitted onto the rotor core 210 from the other side of the rotor core 210 in the axial direction.

In the drawings, it is illustrated that the magnet holder 230 includes the first magnet holder 230A and the second magnet holder 230B, but the present invention is not limited thereto, and the magnet holder 230 may be a single member which covers all the rotor cores 210 and the magnets 220.

FIG. 4 is a view illustrating the rotor core 210 and the magnets 220, FIG. 5 is a perspective view illustrating the magnet 220.

Referring to FIG. 4, the rotor core 210 may include a plurality of protrusions 211 protruding from an outer surface of the rotor core 210 in a radial direction. The plurality of protrusions 211 are disposed at predetermined intervals in a circumferential direction. Each of the protrusions 211 may be disposed on the outer surface of the rotor core 210 to extend in the axial direction.

The protrusions 211 serve to align positions of the magnets 220 in the circumferential direction and guide insertion of the magnets 220. In the circumferential direction, the magnets 220 are inserted between the protrusions 211 in the axial direction. Hereafter, among the magnets 220 which are adjacent to each other in the circumferential direction and are disposed with the protrusion 211 interposed therebetween, the magnet 220 disposed at one side of the protrusion 211 is referred to as a first magnet 220A, and the magnet 220 disposed at the other side of the protrusion 211 is referred to as a second magnet 220B.

Referring to FIG. 5, the magnet 220 may include an outer surface 221 in contact with the magnet holder 230, an inner surface 222 in contact with the rotor core 210, and two side surface 223 connecting the outer surface 221 and the inner surface 222. In addition, the magnet 220 may include one surfaces 224 forming two end portions of the magnet 220 in the axial direction.

For smooth insertion of the magnet 220, since a circumferential width between the protrusions 211 is greater than a circumferential width of the magnet 220, gaps may occur between the protrusion 211 and the side surfaces of the magnets 220. An error in arranging the magnets 220 in the circumferential direction occurs due to the gaps. Accordingly, the magnet 220 should be pushed clockwise or counterclockwise and arranged.

FIG. 6 is a view illustrating the magnet holder 230, FIG. 7 is a plan view illustrating the magnet holder 230 illustrated in FIG. 6, and FIG. 12 is a side cross-sectional view illustrating the magnet holder 230 illustrated in FIG. 6.

Referring to FIGS. 6, 7, and 12, the magnet holder 230 includes holes 233. The holes 233 are holes into which pins P of an external device for pushing the magnets 220 out in one direction are inserted after the magnet holder 230 is mounted. In addition, each of the hole 233 is a hole through which a state of the magnet 220 and a state of an adhesive applied on the magnet 220 are visually checked.

The magnet holder 230 may be divided into a first part 231 and a second part 232. The first part 231 is a cylindrical member. An end portion of the first part 231 may be bent to form the second part 232. The hole 233 may be disposed in the second part 232. The second part 232 may be divided into a 2A part 232a and a 2B part 232b. The 2A part 232a is bent inward from the first part 231. The 2B part 232b is bent from the 2A part 232a and disposed to be stepped with the 2A part 232a.

The plurality of holes 233 may be disposed at predetermined intervals in the circumferential direction. Positions of the holes 233 in the circumferential direction correspond to the protrusions 211. Accordingly, the number of the holes 233 may correspond to the number of the protrusions 211.

The holes 233 may be disposed in the 2A part 232a.

FIGS. 8 to 10 are views illustrating the protrusion 211 and the magnets 220 exposed through the hole 233.

Referring to FIG. 8, after the magnets 220 are mounted on the rotor core 210, the magnet holder 230 is mounted on the rotor core 210 so that the hole 233 and the protrusion 211 are arranged. When the magnet holder 230 is mounted on the rotor core 210, a part of the protrusion 211 and a part of each of the magnets 220 are exposed through the hole 233. The protrusion 211, one surface and a side surface of the first magnet 220A and one surface and a side surface of the second magnet 220B are exposed through the hole 233.

The hole 233 may include an outer surface 233a, an inner surface 233b facing the outer surface 233a, and two side surfaces 233c connecting the outer surface 233a and the inner surface 233b. A space formed by the outer surface 233a, the side surface of the first magnet 220A, the side surface of the second magnet 220B, and the protrusion 211 is a space into which each of the pin P of the external device may be inserted. This is to secure a maximum space into which the pin P is inserted.

When the magnets 220 are mounted between the protrusions 211, gaps G are generated between the magnets 220 and the protrusions 211. Due to the gaps G, since gaps between the magnets 220 may vary in the circumferential direction, it is necessary to insert the pins P into the holes 233 and push the magnets 220 to arrange the magnets 220.

Meanwhile, a circumferential maximum width W1 of the hole 233 may be set to be greater than a circumferential maximum width W2 of the protrusion 211 so that the protrusion 211, a side surface of the first magnet 220A, and a side surface of the second magnet 220B may be exposed through the hole 233. In addition, a maximum radial length R1 of the hole 233 may be greater than a maximum radial length R2 of the protrusion 211.

Referring to FIG. 9, a first distance L1 and a second distance L2 may be different. The first distance L1 is a circumferential distance between a side surface 233c of the hole 233 and the side surface of the exposed first magnet 220A, and the second distance L2 is a circumferential distance between the side surface 233c of the hole 233 and the side surface of the exposed second magnet 220B. In this case, the first distance L1 and the second distance L2 may be distances on a circumference of a virtual circle O passing through a center of the side surface 233c of the hole 233.

As in FIG. 10, a third distance L3 and a fourth distance L4 may be different. The third distance L3 may be a circumferential distance between a reference line T, which crosses a circumferential width center P1 of the hole 233 and an axial center C of the shaft 100, and the exposed side surface of the first magnet 220A. The fourth distance L4 may be a circumferential distance between the reference line T and the exposed side surface of the second magnet 220B. In this case, the third distance L3 and the fourth distance L4 may be distances on the circumference of the virtual circle O passing through the center of the side surface 233c of the hole 233.

In addition, the hole 233 may be formed so that the reference line T crosses a circumferential center P2 of the protrusion 211.

FIG. 11 is a view illustrating a hole 233 according to another embodiment.

Referring to FIG. 11, a groove 233aa formed to be concave outward may be disposed in an outer surface 233a of the hole 233. The groove 233aa may be disposed in a region which does not overlap magnets 220 on the outer surface 233a of the hole 233. This is to prevent outer surfaces of the magnets 220 from being exposed through the groove 233aa. The groove 233aa has an advantage of expanding a space formed by the outer surface 233a of the hole 233, side surfaces of the magnets 220, and a protrusion 211 and securing a large space into which a pin P of an external device may be inserted.

FIG. 13 is a view illustrating a state in which the pin P of the external device is aligned with the hole 233 of the magnet holder 230, and FIG. 14 is a view illustrating a state in which the pin P of the external device is inserted into the hole 233.

Referring to FIG. 13, the pin P of the external device is aligned in the radial direction to be inserted from an outer region of the protrusion 211. Although one pin P is illustrated in the drawing, the plurality of pins P may be disposed to be aligned with the holes 233. Referring to FIG. 14, the pin P is inserted into the outer region of the protrusion 211 in the radial direction. The pins P may be inserted into all the holes 233 of the magnet holder 230.

FIG. 15 is a view illustrating a process of aligning the magnets 220 using the pin P.

Referring to FIG. 15, in a state in which the pin P is inserted into the hole 233, when the pin P rotates clockwise or counterclockwise, the pin P pushes and moves the magnet 220 clockwise or counterclockwise. Any one of the pins P inserted into the adjacent holes 233 pushes the side surface of the first magnet 220A to move the first magnet 220A until the first magnet 220A comes into contact with the protrusion 211. The other pin P pushes the side surface of the second magnet 220B in the other hole 233 to move the second magnet 220B until the second magnet 220B comes into contact with the protrusion 211.

When all the magnets 220 are moved clockwise or counterclockwise as described above, the magnets 220 may be aligned to be positioned at predetermined intervals in the circumferential direction even after the magnet holder 230 is mounted.

FIG. 16 is a perspective view illustrating a rotor according to another embodiment, and FIG. 17 is an exploded perspective view illustrating the rotor.

Referring to FIG. 16, a rotor 1200 may include a rotor core 1210, a plurality of magnets 1220 disposed outside the rotor core 1210, and a magnet holder 1230 which covers the rotor core 1210 and the magnets 1220.

Referring to FIG. 17, the rotor core 1210 may include a first rotor core 1210A and a second rotor core 1210B. The first rotor core 1210A and the second rotor core 1210B may be disposed in an axial direction. In addition, the magnet holder 1230 may include a first magnet holder 1230A and a second magnet holder 1230B. The first magnet holder 1230A may cover the first rotor core 1210A. The second magnet holder 1230B may cover the second rotor core 1210B. However, the present invention is not limited thereto, and the magnet holder may also be a single member. One magnet holder may cover the first rotor core 1210A and the second rotor core 1210B.

FIG. 18 is a perspective view illustrating a magnet.

Referring to FIG. 18, the magnet 1220 may include an outer surface 1221 in contact with the magnet holder 1230, an inner surface 1222 in contact with the rotor core 1210, and two side surfaces 1223 connecting the outer surface 1221 and the inner surface 1222. In addition, the magnet 1220 may include one surfaces 1224 forming two end portions of the magnet 1220 in the axial direction.

Referring to FIG. 17 again, the magnet holder 1230 may include a first part 1231 and a second part 1232. The first part 1231 is a cylindrical member. The first part 1231 may be in contact with the outer surface 1221 of the magnet 1220. The first part 1231 may cover an outer circumferential surface of the rotor core 1210. In addition, the second part 1232 may be formed to be bent from an end portion of the first part 1231. In this case, the second part 1232 may extend toward an axial center of the rotor core 1210. The second part 1232 may be in contact with the one surface 1224 of the magnet 1220. In addition, the second part 1232 may cover one surface of the rotor core 1210 disposed in the axial direction.

The rotor core 1210 includes a plurality of protrusions 1211. The plurality of protrusions 1211 protrude from the outer circumferential surface of the rotor core 1210 in a radial direction. The plurality of protrusions 1211 are disposed to be spaced at predetermined intervals from each other in a circumferential direction. Each of the protrusions 1211 may be disposed on the outer surface of the rotor core 1210 to extend in the axial direction. The protrusions 1211 serve to arrange positions of the magnets 1220 in the circumferential direction and guide insertion of the magnets 1220. In the circumferential direction, the magnets 1220 are inserted between the protrusions 1211 in the axial direction. Hereafter, among the magnets 1220 which are adjacent to each other in the circumferential direction and disposed with the protrusion 1211 interposed therebetween, the magnet 1220 disposed at one side of the protrusion 1211 is referred to as a first magnet 1220A, and the magnet 1220 disposed at the other side of the protrusion 1211 is referred to as a second magnet 1220B.

FIG. 19 is a plan view illustrating the rotor.

Referring to FIG. 19, the magnet holder 1230 includes a hole 1230H. In this case, alignment of the magnet 1220 may be checked through the hole 1230H. An external jig for aligning the magnet 1220 may be inserted into the hole 1230H. The hole 1230H may be provided as a plurality of holes 1230H. The plurality of holes 1230H may be spaced apart from each other in the circumferential direction. The hole 1230H may overlap the protrusion 1211 in the axial direction. That is, when the rotor 1200 is viewed in the axial direction, the protrusion 1211 may be exposed through the hole 1230H. Accordingly, an operator may visually check an alignment state of the magnet 1220 through the hole 1230H.

The first magnet 1220A may include a first side surface 1223A. The first side surface 1223A may be disposed to face the second magnet 1220B. In addition, the second magnet 1220B may include a second side surface 1223B. The second side surface 1223B may be disposed to face the first side surface 1223A. The first side surface 1223A and the second side surface 1223B may overlap the hole 1230H in the axial direction. Accordingly, the operator may check positions of the first side surface 1223A and the second side surface 1223B through the hole 1230H.

FIGS. 20 to 22 are enlarged views illustrating region A of FIG. 19.

Referring to FIG. 20, the protrusion 1211 may include a first surface 2111, a second surface 2112, and a first region 2113. The first surface 2111 may come into contact with the first side surface 1223A. In addition, the second surface 2112 may come into contact with the second side surface 1223B. The first region 2113 is disposed between the first surface 2111 and the second surface 2112. In this case, a groove 2113G may be formed in an outer circumferential surface of the first region 2113.

Meanwhile, gaps G may be formed between an outer circumferential surface of the protrusion 1211 and the first side surface 1223A and between the outer circumferential surface of the protrusion 1211 and the second side surface 1223B. In this case, the gaps may overlap the hole 1230H in the axial direction. When the rotor 1200 is viewed in the axial direction, a gap G1 may be exposed through the hole 1230H. In this case, the jig may be disposed in the gap G1.

Referring to FIG. 21, the first region 2113 may include a first portion S1, a second portion S2, and a third portion S3. The first region 2113 may have a minimum radial length at the first portion 51. The second portion S2 may be disposed between the first portion 51 and the first surface 2111. In addition, the third portion S3 may be disposed between the first portion S1 and the second surface 2112. A radial length of the first region 2113 may gradually increase from the first portion S1 toward the second portion S2 or the third portion S3.

Referring to FIG. 22, the first region 2113 has a maximum length Lmax and a minimum length Lmin in the radial direction. In this case, the maximum length Lmax may be a radial length of the second portion S2 or the third portion S3. In addition, the minimum length Lmin may be a radial length of the first portion S1. According to the embodiment, in the first region 2113, a ratio of the minimum length Lmin to the maximum length Lmax may be 0.3 to 0.8.

FIG. 23 is an exploded perspective view illustrating the rotor core.

Referring to FIG. 23, the rotor core 1210 may include a rotor plate 1210P. The rotor plate 1210P is provided as a plurality of rotor plates 1210P. The plurality of rotor plates 1210P may be stacked in the axial direction to form the rotor core 1210.

The rotor plates 1210P may include a first rotor plate 1211P and a second rotor plates 1212P.

The first rotor plate 1211P may be provided as a plurality of first rotor plates 1211P. The first rotor plates 1211P may be provides as 5 first rotor plates 1211P. The plurality of first rotor plates 1211P may be continuously stacked on each other. In addition, the first rotor plates 1211P may be disposed close to the second part 1232.

The second rotor plate 1212P may be provided as a plurality of second rotor plates 1212P. The plurality of second rotor plates 1212P may be continuously stacked on each other. The plurality of stacked second rotor plates 1212P may be disposed in the axial direction from the plurality of stacked first rotor plates 1211P. The second rotor plates 1212P may be spaced apart from the second part 1232. In this case, the first rotor plates 1211P may be disposed between the second rotor plates 1212P and the second part 1232.

FIG. 24 is a plan view illustrating the first rotor plate, and FIG. 25 is a plan view illustrating the second rotor plate.

Referring to FIGS. 24 and 25, the first rotor plate 1211P and the second rotor plate 1212P may have different shapes.

The first rotor plate 1211P includes first protrusions P1. The first protrusions P1 protrude from an outer circumferential surface of the first rotor plate 1211P. Each of the first protrusions P1 includes a 1A surface A1 and a 2A surface A2. The 1A surface A1 and the 2A surface A2 are disposed in the circumferential direction. In addition, a 1A region SA is disposed between the 1A surface A1 and the 2A surface A2. A first groove Gi1 may be formed in the 1A region SA.

The second rotor plate 1212P includes second protrusions P2. The second protrusions P2 protrude from an outer circumferential surface of the second rotor plate 1212P. Each of the second protrusions P2 includes a 1B surface B1 and a 2B surface B2. The 1B surface B1 and the 2B surface B2 are disposed in the circumferential direction. In addition, a 1B region SB is disposed between the 1B surface B1 and the 2B surface B2. A minimum radial length L12 of the 1B region SB may be greater than a radial minimum length L11 of the 1A region SA. A groove is not formed in the 1B region SB. In this case, the first rotor plate 1211P and the second rotor plate 1212P are different only in the presence or absence of a groove formed in the 1A region SA and the 1B region SB, and the rest may have the same structure.

FIG. 26 is a set of views illustrating a first protrusion according to a modified embodiment.

Referring to FIG. 26, a first groove Gi1 of a first protrusion P1 has a first width W1 in a circumferential direction and a first depth D1 in a radial direction. In this case, in the first protrusion P1, sizes of the first width W1 and the first depth D1 of the first groove Gi1 may vary. In this case, as the sizes of the first width W1 and the first depth D1 increase, deformation thereof using a jig is easy, but stiffness of the first protrusion P1 may degrade. Meanwhile, as the first width W1 and the first depth D1 decrease, the stiffness of the first protrusion P1 is improved, but a higher pressing force of the jig to deform the first protrusion P1 is required. Accordingly, the first width W1 and the first depth D1 may be adjusted according to stiffness of a material of the first protrusion P1.

FIG. 27 is a view illustrating a state before the first protrusion is deformed.

Referring to FIG. 27, the first protrusion P1 may be exposed through the hole 1230H. At least a part of the 1A surface A1 may be spaced apart from the first side surface 1223A. In addition, at least a part of the 2A surface A2 may be spaced apart from the second side surface 1223B. In the drawing, it is illustrated that the 1A surface A1 and the 2A surface A2 are not in contact with the first side surface 1223A and the second side surface 1223B, respectively, but only a part of the 1A surface A1 and only a part of the 2A surface A2 may be spaced apart from the first side surface 1223A and the second side surface 1223B. Accordingly, an air gap AG may be formed between the 1A surface A1 and the first side surface 1223A or between the 2A surface A2 and the second side surface 1223B.

FIG. 28 is a view illustrating a state in which the first protrusion is deformed.

Referring to FIG. 28, a jig J may be inserted into the gap. The jig J may pass through the hole 1230H. The jig J may be in contact with the first protrusion P1. The jig J may be inserted as much as an axial thickness of the stacked first rotor plates 1211P. The 1A region SA may be pressed toward the axial center of the rotor core 1210 by the inserted jig J. In this case, a circumferential width of the first groove may expand. In addition, the 1A surface A1, and the 2A surface A2 may be in close contact with the first side surface 1223A and the second side surface 1223B, respectively. In this case, the air gap AG illustrated in FIG. 27 may be reduced or eliminated. The motor according to the present invention may check alignment of the magnets in a state in which the magnet holder is mounted, and the magnets may be easily aligned.

FIG. 29 is a view illustrating a state in which a shaft is coupled to a rotor core of a motor according to still another embodiment.

Referring to FIG. 29, a rotor according to the present invention is formed so that a plurality of rotor cores 321, 322, and 323 are stacked. In the embodiment, a state in which three rotor cores are stacked is illustrated, but the number of rotor cores may be adjusted appropriately according to a design. Each of the rotor cores 321, 322, and 323 is formed so that a plurality of rotor plates are stacked. Each of the rotor plates is formed in a thin disc shape. The plurality of rotor plates may be stacked in an axial direction.

The rotor cores may include first rotor cores 321 and a second rotor core 322. The first rotor cores 321 may be disposed in the axial direction from the second rotor core 322. The first rotor cores 321 and the second rotor core 322 are disposed to be coupled to a shaft 337 and rotated at predetermined angles. When the first rotor cores 321 and the second rotor core 322 are stacked to have an angular deviation, there is an effect of reducing a cogging torque. According to the embodiment, one of the first rotor cores 321 may be disposed at one end portion of the second rotor core 322, and the first rotor core 321 may be stacked to be rotated at the predetermined angle in a clockwise direction with respect to the second rotor core 322. The other first rotor core 323 may be disposed on another end portion of the second rotor core 322. The other first rotor core 323 may be stacked to be rotated at the predetermined angle in the clockwise direction with respect to the second rotor core 322. Hereinafter, an angle at which a rotor core rotates clockwise or counterclockwise is defined as a skew angle.

FIG. 30 is a view illustrating a state in which the first rotor core and the second rotor core are being stacked.

Referring to FIG. 30, the second rotor core 322 is disposed on one surface of the first rotor core 321. The second rotor core 322 has a predetermined skew angle with respect to the first rotor core 321. In addition, the second rotor core 322 may be fixed to one surface of the first rotor core 321. To This end, the first rotor core 321 may include a protrusion, and the second rotor core 322 may include a groove in which the protrusion is disposed.

The first rotor core 321 has a first surface 321A in contact with the second rotor core 322. In addition, the second rotor core 322 has a second surface 322B in contact with the first surface 321A. In this case, the first rotor core 321 may include a plurality of protrusions 321P disposed on the first surface 321A. The number of protrusions 321P may be the same as the number of poles (number of magnets) of a motor. The plurality of protrusions 321P may be spaced apart from each other in a circumferential direction. The plurality of protrusions 321P may be spaced at equal intervals from each other in the circumferential direction.

The second rotor core 322 may include a plurality of first grooves 322G1 disposed in the second surface 322B. The number of first grooves 322G1 may be the same as the number of protrusions 321P. The plurality of first grooves 322G1 may be disposed to be spaced apart from each other in the circumferential direction. The plurality of first grooves 322G1 may be spaced at equal intervals from each other in the circumferential direction. In addition, the second rotor core 322 may include a plurality of second grooves 322G2 disposed in the second surface 322B. The number of the second grooves 322G2 may be equal to the number of first grooves 322G1. Each of the second grooves 322G2 may be disposed between the first grooves 322G1 spaced apart from each other. In this case, a distance of the second groove 322G2 to the first groove 322G1 disposed at one side of the second groove 322G2 may be greater than a distance to the first groove 322G1 disposed at the other side.

FIG. 31 is a plan view illustrating the first rotor core.

Referring to FIG. 31, the plurality of protrusions 321P are disposed on the first surface 321A. Each of the protrusion 321P may have a radial length greater than a circumferential width. The radial length of the protrusion 321P may be smaller than a radial length of each of the rotor cores 321, 322, and 323. According to the embodiment, a ratio of the radial length of the protrusion 321P to the radial length of each of the rotor cores 321, 322, and 323 may be 0.25 to 0.4. A plurality of protruding parts 321S may be disposed on an outer circumferential surface of the first rotor core 321. The protruding parts 321S may be disposed to be spaced apart from each other in the circumferential direction. The number of protruding parts 321S may be equal to the number of magnets 324. The magnets 324 are attached to the outer circumferential surface of the first rotor core 321 which are divided by the protruding parts 321S.

When a virtual straight line extending to cross a width center of the magnet 324 from an axial center C of the first rotor core 321 is defined as a first virtual line L31, and a virtual straight line extending to cross a width center of the protrusion 321P from the axial center C of the first rotor core 321 is defined as a second virtual line L32, the first virtual line L31 may be disposed at a first arrangement angle $\theta 1$ with respect to the second virtual line L32. In this case, the first virtual line L31 may be disposed between two different second virtual lines L32. In addition, when a virtual line extending to cross a width center of the protruding part 321S from the axial center C of the first rotor core 321 is defined as a fifth virtual line L35, the second virtual line L32 and the fifth virtual line L35 may overlap.

FIG. 32 is a bottom view illustrating the second rotor core.

Referring to FIG. 32, the plurality of first grooves 322G1 and the plurality of second grooves 322G2 are disposed on the second surface 322B. The second groove 322G2 may be disposed between two different first grooves 322G1. The first groove 322G1 and the second groove 322G2 may be disposed to be colinear with each other on a circumferential line. A plurality of protruding parts 322S may be disposed on an outer circumferential surface of the second rotor core 322. Each of the plurality of protruding part 322S of the second rotor core 322 may have the same shape as the protruding part 321S of the first rotor core 321 illustrated in FIG. 31, except that the protruding part 322S of the second rotor core 322 is disposed to be rotated to have a predetermined angular deviation from each other.

When a virtual straight line extending to cross the width center of the magnet 324 from an axial center C of the second rotor core 322 is defined as a third virtual line L33, a virtual straight line extending to cross a width center of the second groove 322G2 from the axial center C of the second rotor core 322 is defined as a fourth virtual line L34, and a virtual straight line extending to cross a width center of the first groove 322G1 from the axial center C of the second rotor core 322 is defined as a sixth virtual line L36, the fourth virtual line L34 may be disposed between the third virtual line L33 and the sixth virtual line L36.

The fourth virtual line L34 may be disposed between two different third virtual lines L33. The fourth virtual line L34 may be disposed at a third arrangement angle $\theta 3$ with respect to one third virtual line L33 and disposed at a third arrangement angle $\theta 3$ with respect to the other virtual line L33. In addition, the second arrangement angle $\theta 2$ may be different from the first arrangement angle $\theta 1$ illustrated in FIG. 31. In addition, the fourth virtual line L34 may be disposed at a fourth arrangement angle $\theta 4$ with respect to the sixth virtual line L36. In this case, a different value between the first arrangement angle $\theta 1$ and the second arrangement angle $\theta 2$ may be equal to the fourth arrangement angle $\theta 4$. In addition, the fourth arrangement angle $\theta 4$ may be equal to the skew angle between the first rotor core 321 and the second rotor core 322.

FIG. 33 is an exploded perspective view illustrating the first rotor core.

Referring to FIG. 33, the first rotor core 321 may include a plurality of first rotor plates 3237 and a third rotor plate 3230. The plurality of first rotor plates 3237 are continuously stacked, and the third rotor plate 3230 may be disposed on one surface of the stacked first rotor plates 3237. In addition, the second rotor core 322 may be disposed on one surface of the third rotor plate 3230. The third rotor plate 3230 may be provided as at least one third rotor plate 3230.

FIGS. 34 and 35 are plan views illustrating a first rotor plate and a second rotor plate.

Referring to FIG. 34, each of the first rotor plates 3237 and each of second rotor plates 3220 are the same members having the same shape except that the first rotor plate 3237 and the second rotor plate 3220 are disposed to be rotated to have an angular deviation from each other.

The first rotor plate 3237 may have a 1A surface A31 and a 2A surface A32. The 1A surface A31 of any one first rotor plate 3237 may be in contact with the 2A surface A32 of the other first rotor plate 3237. The first rotor plate 3237 may include a 1A protrusion 3211 and a 2A protrusion 3212 disposed on the first A surface A31. The 1A protrusion 3211 and the 2A protrusion 3212 may be provides as a plurality of 1A protrusions 3211 and a plurality of 2A protrusions 3212, respectively. The plurality of 1A protrusions 3211 may be disposed to be spaced at equal intervals from each other in the circumferential direction. In addition, the 2A protrusion 3212 may be disposed between two spaced 1A protrusions 3211. The plurality of 2A protrusions 3212 may be spaced at equal intervals from each other in the circumferential direction.

Similarly, the second rotor plate 3220 may have a 1B surface B1 and a 2B surface B2. The 1B surface B1 of one second rotor plate 3220 may be in contact with the second surface B2 of the other second rotor plate 3220. The second rotor plate 3220 may include a 1B protrusion 3221 and a 2B protrusion 3222 disposed on the 1B surface B1.

A plurality of holes may be formed in each of the first rotor plate 3237 and the second rotor plate 3220. The plurality of holes may be disposed to be spaced apart from each other in the circumferential direction. The plurality of holes may include a first hole H1 and a second hole H2 disposed in the circumferential direction. In this case, the 1A protrusion 3211 and the 2A protrusion 3212 may be disposed between the first hole H1 and the second hole H2 of the first rotor plate 3237, and the 1B protrusion 3221 and the 2B protrusion 3222 may be disposed between the first hole H1 and the second hole H2 of the second rotor plate 3220.

Hereinafter, arrangement angles of virtual lines extending from an axial center C of the first rotor plate 3237 to the width center of the magnet 324, a width center of the 1A protrusion 3211, and a width center of the 2A protrusion 3212 will be described. The content will be described based on the first rotor plate 3237 and will be equally applied to the second rotor plate 3220.

Referring to FIG. 35, a virtual straight line extending to cross the width center of the magnet 324 from the axial center C of the first rotor plate 3237 is defined as a 1A virtual line LA1, a virtual straight line extending to cross the width center of the 1A protrusion 3211 from the axial center C of the first rotor plate 3237 is defined as a 2A virtual line LA2, and a virtual straight line extending to cross the width center of the 2A protrusion 3212 from the axial center C of the first rotor plate 3237 is defined as a 3A virtual line LA3, the 3A virtual line LA3 may be disposed between the 1A virtual line LA1 and the 2A virtual line LA2. The 3A virtual line LA3 may be disposed closer to the 2A virtual line LA2 than to the 1A virtual line LA1.

FIGS. 36 and 37 are bottom views illustrating the first rotor plate and the second rotor plate.

Referring to FIG. 36, the first rotor plate 3237 may include a 1A groove 3213 and a 2A groove 3214 disposed in the 2A surface A32. The 1A groove 3213 and the 2A groove 3214 are provided as a plurality of 1A grooves 3213 and a plurality of 2A grooves 3214, respectively. The plurality of 1A grooves 3213 may be spaced at equal intervals from each other in the circumferential direction. In addition, the 2A groove 3214 may be disposed between two spaced 1A grooves 3213. The plurality of 2A grooves 3214 may be spaced at equal intervals from each other in the circumferential direction. In this case, in the first rotor plate 3237, the 1A groove 3213 and the 1A protrusion 3211 may be formed by punching at the same time, and the 2A groove 3214 and the 2A protrusion 3212 may be formed by punching at the same time.

Similarly, the second rotor plate 3220 may include a 1B groove 3223 and a 2B groove 3224 disposed in the 2B surface B2. Since the 1B groove 3223 and the 2B groove 3224 are portions corresponding to the 1A groove 3213 and the 2A groove 3214, the 1B groove 3223 and the 2B groove 3224 will not be described repeatedly.

Hereinafter, arrangement angles of virtual lines extending to cross the width center of the magnet 324, a width center of the 1A groove 3213, and a width center of the 2A groove 3214 from the axial center C of the first rotor plate 3237 will be described. The content will be described based on the first rotor plate 3237 and will be equally applied to the second rotor plate 3220.

Referring to FIG. 37, a virtual straight line extending to cross the width center of the magnet 324 from the axial center C of the first rotor plate 3237 is defined as a 1B virtual line LB1, a virtual straight line extending to cross the width center of the 1A groove 3213 from the axial center C of the first rotor plate 3237 is defined as a 2B virtual line LB2, and a virtual straight line extending to cross the width center of the 2A groove 3214 from the axial center C of the first rotor plate 3237 is defined as a 3B virtual line LB3, the 3B virtual line LB3 may be disposed between the 1B virtual line LB1 and the 2B virtual line LB2. In addition, the 3B virtual line LB3 may be disposed closer to the 2B virtual line LB2 than to the 1B virtual line LB1.

FIG. 38 and FIG. 39 are plan views illustrating the third rotor plate.

Referring to FIG. 38, the third rotor plate 3230 may have a 1C surface C1 and a 2C surface. The 1C surface C1 may be in contact with the 2B surface B2 of the second rotor plate 3220. In addition, the 2C surface is an opposite side of the 1C surface and may be in contact with the 1A surface A31 of the first rotor plate 3237. The third rotor plate 3230 may include a 1C protrusion 3231 disposed on the 1C surface C1. The third rotor plate 3230 may include a 1C hole 3232 passing through the 1C surface C1 and the 2C surface C2.

Referring to FIG. 39, a virtual straight line extending to cross the width center of the magnet 324 from the axial center C of the third rotor plate 3230 is defined as a 1C virtual line LC1, a virtual straight line extending to cross a width center of the 1C protrusion 3231 from the axial center C of the third rotor plate 3230 is defined as a 2C virtual line LC2, and a virtual straight line extending to cross a width center of the 1C hole 3232 from the axial center C of the third rotor plate 3230 is defined as a 3C virtual line LC3, the 3C virtual line LC3 may be disposed between the 1C virtual line LC1 and the 2C virtual line LC2. In addition, the 3C virtual line LC3 may be disposed closer to the 2C virtual line LC2 than to the 1C virtual line LC1.

FIG. 40 is a view illustrating a state in which the plurality of first rotor plates and the third rotor plate are being stacked.

Referring to FIG. 40, the first rotor core 321 may be formed so that the plurality of first rotor plates 3237 and one third rotor plate 3230 are stacked. The plurality of first rotor plates 3237 may be stacked continuously. In addition, the third rotor plate 3230 may be disposed on one surface of the plurality of stacked first rotor plates 3237. In this case, a third protruding part 3230S formed on an outer circumferential surface of the third rotor plate 3230 may be disposed to be colinear with the first protruding part 237S formed on an outer circumferential surface of the first rotor plate 3237 in the axial direction. The 1A protrusion 3211 may overlap the 1C protrusion 3231 in the axial direction. In addition, the 2A protrusion 3212 may be disposed in the 1C hole 3232. In this case, an axial protruding length of the 2A protrusion 3212 may be smaller than an axial thickness of the third rotor plate 3230. Accordingly, one end of the 2A protrusion 3212 may be disposed at a level lower than one surface of the third rotor plate 3230.

FIG. 41 is a view illustrating a state in which the plurality of first rotor plates, a plurality of second rotor plates, and the third rotor plate are being stacked.

Referring to FIG. 41, the second rotor core 322 may be stacked on one surface of the third rotor plate 3230. In this case, the second rotor core 322 may be formed so that a plurality of second rotor plates 3220 are stacked. In addition, although not illustrated in the drawing, the second rotor core 322 may include a fourth rotor plate (not shown). The fourth rotor plate (not shown) may be disposed on one surface of the plurality of second rotor plates. The fourth rotor plate may have the same shape as the third rotor plate. In addition, the other first rotor core may be disposed on one surface of the fourth rotor plate.

The second rotor plate 3220 is disposed to be rotated at an angular deviation with respect to the third rotor plate 3230. A second protruding part 220S protruding from an outer circumferential surface of the second rotor plate 3220 is disposed to be misaligned with respect to the third protruding part 3230S by a predetermined angle. In addition, the 1C protrusion 3231 may be disposed in the 2B groove and may overlap the 2B protrusion 3222 in the axial direction. The 1C protrusion 3231 may be coupled to the 2B groove to fix the first rotor core 321 and the second rotor core 322.

According to such a structure, since the skew angle can be adjusted while stacking the first to third rotor plates, work efficiency increases, and since the protrusions are inserted into the grooves or holes, and the rotor plates are stacked, a coupling force between the rotor plates increases. In addition, a slip torque between the contact surfaces of the rotor cores increases, a slipping phenomenon between the rotor cores can be prevented, and an operation of the rotor can be stabilized.

The embodiments described above can be used in various devices such as vehicles or home appliances.

The invention claimed is:

1. A motor comprising:
a shaft;
a rotor coupled to the shaft; and
a stator disposed to correspond to the rotor,
wherein the rotor includes a rotor core, a plurality of magnets coupled to the rotor core, and a magnet holder disposed outside the magnets,
the rotor core includes protrusions disposed between the adjacent magnets,
the magnet holder includes holes, and
a part of each of the protrusions and a part of the magnet are exposed through one of the holes,
wherein a maximum radial length of the hole is greater than a maximum radial length of the protrusion.

2. The motor of claim 1, wherein:
the plurality of holes are disposed at predetermined intervals in a circumferential direction; and
each of the holes is disposed to correspond to one of the protrusions.

3. The motor of claim 1, wherein a maximum circumferential width of the holes is greater than a maximum circumferential width of the protrusion.

4. The motor of claim 1, wherein the magnet holder includes a first part disposed on a side surface of each of the magnets and a second part connected to the first part and disposed on one surface of the magnet,
wherein the second part includes the holes.

5. The motor of claim 1,
wherein the magnets include a first magnet and a second magnet spaced apart from the first magnet in a circumferential direction,
the rotor core includes protrusions each disposed between the first magnet and the second magnet,
the protrusion includes a first surface facing the first magnet, a second surface facing the second magnet, and a first region disposed between the first surface and the second surface,
the first region includes a first portion, a second portion disposed between the first portion and the first surface, and a third portion disposed between the first portion and the second surface,
a radial length of the first portion is smaller than a radial length of the second portion or the third portion, and
the magnet holder includes holes axially overlapping the protrusions in an axial direction.

6. The motor of claim 5, wherein the protrusion includes a groove disposed between the second portion and the third portion.

7. The motor of claim 5, wherein:
the plurality of holes are disposed at predetermined intervals in the circumferential direction; and
each of the holes is disposed to correspond to one of the protrusions.

8. A motor comprising:
a shaft;
a rotor coupled to the shaft; and
a stator disposed to correspond to the rotor,
wherein the rotor includes a rotor core and a plurality of magnets coupled to the rotor core,
the rotor core includes a first rotor core and a second rotor core disposed in an axial direction from the first rotor core,
the first rotor core has a first surface in contact with the second rotor core and includes a protrusion disposed on the first surface,
the second rotor core has a second surface in contact with the first surface and includes a first groove disposed in the second surface and a second groove disposed in a circumferential direction from the first groove, and
the protrusion is disposed in the second groove,
wherein the second rotor core include a first hole and a second hole spaced apart from the first hole in the circumferential direction, and the first groove and the second groove is disposed between the first hole and the second hole in the circumferential direction,
wherein a first arrangement angle between a first virtual line crossing a width center of the magnet from an axial center of the first rotor core and a second virtual line crossing a width center of the protrusion from the axial center of the first rotor core is different form a second arrangement angle between a third virtual line crossing the width center of the magnet from an axial center of the second rotor core and a fourth virtual line crossing a width center of the second groove from the axial center of the second rotor core.

9. The motor of claim 8, wherein:
the first rotor core includes a plurality of first protruding parts disposed on an outer circumferential surface of the first rotor core in the circumferential direction; and the second virtual line overlaps a fifth virtual line crossing a width center of the first protruding part from the axial center of the first rotor core.

* * * * *